United States Patent
Ueki et al.

(10) Patent No.: US 9,635,370 B2
(45) Date of Patent: Apr. 25, 2017

(54) IMAGE PROCESSING APPARATUS AND IMAGE PROCESSING METHOD, IMAGE ENCODING APPARATUS AND IMAGE ENCODING METHOD, AND IMAGE DECODING APPARATUS AND IMAGE DECODING METHOD

(71) Applicant: SONY CORPORATION, Tokyo (JP)

(72) Inventors: Nobuo Ueki, Tokyo (JP); Toshinori Ihara, Tokyo (JP); Takefumi Nagumo, Kanagawa (JP); Hironari Sakurai, Kanagawa (JP); Shuo Lu, Tokyo (JP); Yoshitaka Morigami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/630,833

(22) Filed: Feb. 25, 2015

(65) Prior Publication Data
US 2015/0256839 A1  Sep. 10, 2015

(30) Foreign Application Priority Data

Mar. 7, 2014 (JP) ................................. 2014-044672

(51) Int. Cl.
*G06K 9/36* (2006.01)
*H04N 19/30* (2014.01)
(Continued)

(52) U.S. Cl.
CPC ............... *H04N 19/30* (2014.11); *G06T 9/00* (2013.01); *H04N 19/426* (2014.11); *H04N 19/85* (2014.11)

(58) Field of Classification Search
CPC .... H04N 19/30; H04N 19/136; H04N 19/187; H04N 19/50; H04N 19/44; H04N 21/234327; H04N 19/184; H04N 19/42; H04N 19/426; H04N 19/85; H04N 19/61; H04N 21/234363
See application file for complete search history.

(56) References Cited

U.S. PATENT DOCUMENTS

2009/0074060 A1*  3/2009  Kim .................. H04N 21/23432
                                                    375/240.12
2010/0046612 A1*  2/2010  Sun ....................... H04N 19/149
                                                    375/240.02
(Continued)

FOREIGN PATENT DOCUMENTS

JP        2010-141771 A    6/2010
JP        2010-171609 A    8/2010
(Continued)

OTHER PUBLICATIONS

Taubman, David. "High performance scalable image compression with EBCOT." IEEE Transactions on image processing 9.7 (2000): 1158-1170.*

*Primary Examiner* — Li Liu
(74) *Attorney, Agent, or Firm* — Chip Law Group

(57) ABSTRACT

Provided is an image processing apparatus including: an encoder configured to scalably encode image data; a write unit configured to cause storage via a predetermined bus to store encoded data that is the image data scalably encoded by the encoder; a read unit configured to read a desired layer of the encoded data from the storage via the bus; and a decoder configured to scalably decode the encoded data read from the storage by the read unit.

18 Claims, 20 Drawing Sheets

(51) Int. Cl.
*H04N 19/85* (2014.01)
*H04N 19/426* (2014.01)
*G06T 9/00* (2006.01)

(56) References Cited

U.S. PATENT DOCUMENTS

| | | | | |
|---|---|---|---|---|
| 2013/0128990 | A1* | 5/2013 | Narasimhan | H04N 19/00533 375/240.25 |
| 2014/0185664 | A1* | 7/2014 | Van Der Auwera | H04N 19/50 375/240.02 |
| 2014/0192884 | A1* | 7/2014 | Laroche | H04N 19/105 375/240.16 |
| 2015/0063465 | A1* | 3/2015 | Hattori | H04N 9/73 375/240.25 |
| 2015/0172670 | A1* | 6/2015 | Li | H04N 19/136 375/240.08 |
| 2015/0189322 | A1* | 7/2015 | He | H04N 19/597 375/240.16 |
| 2015/0288963 | A1* | 10/2015 | Sato | H04N 19/11 375/240.14 |
| 2015/0341638 | A1* | 11/2015 | Francois | H04N 19/11 375/240.12 |

FOREIGN PATENT DOCUMENTS

| | | |
|---|---|---|
| JP | 2013-017014 A | 1/2013 |
| JP | 2013-098873 A | 5/2013 |
| JP | 2013-146038 A | 7/2013 |

\* cited by examiner

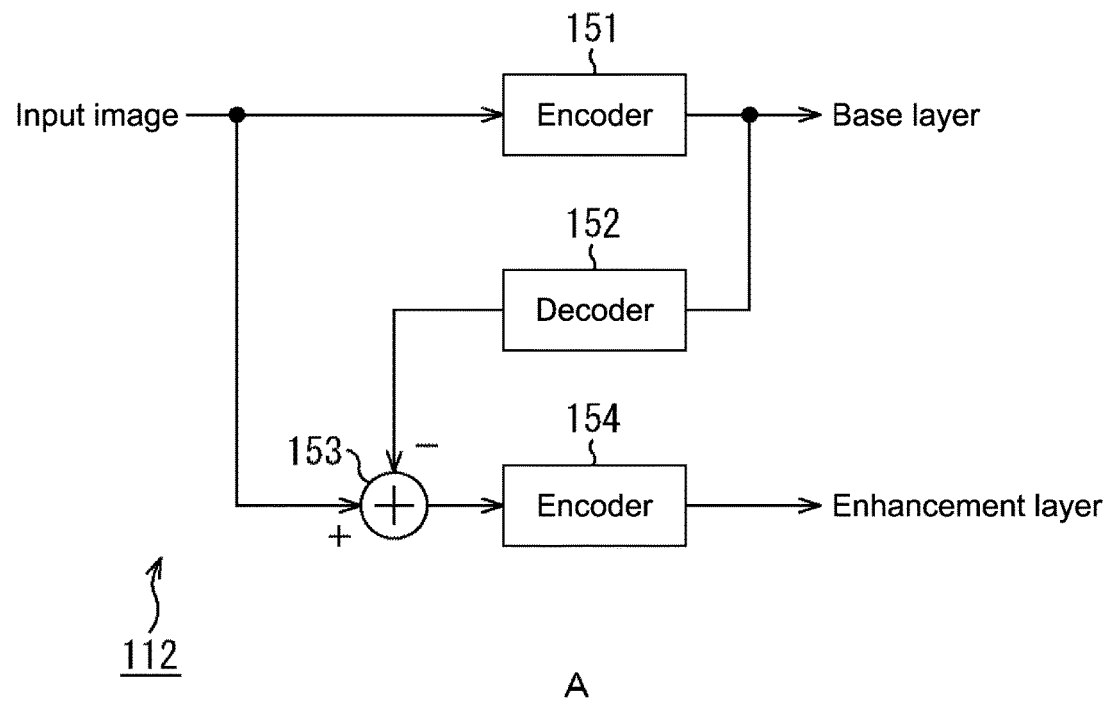
A
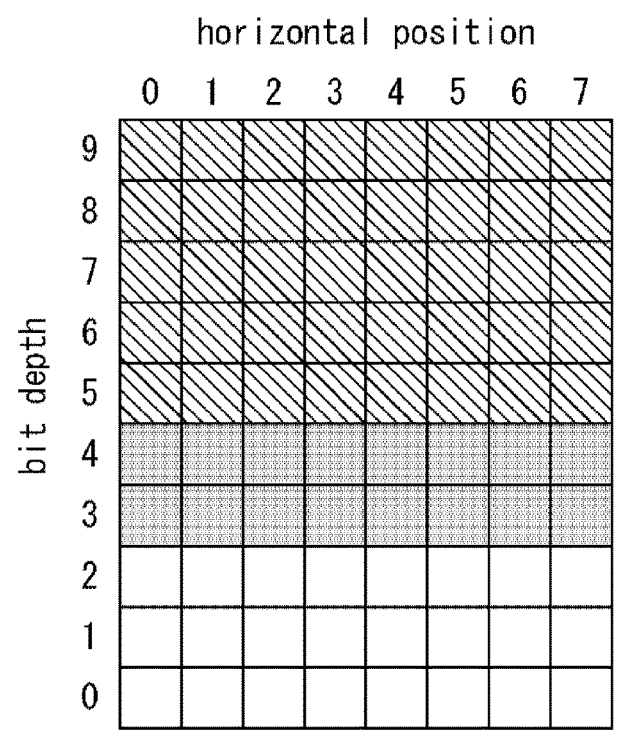
B
FIG.5

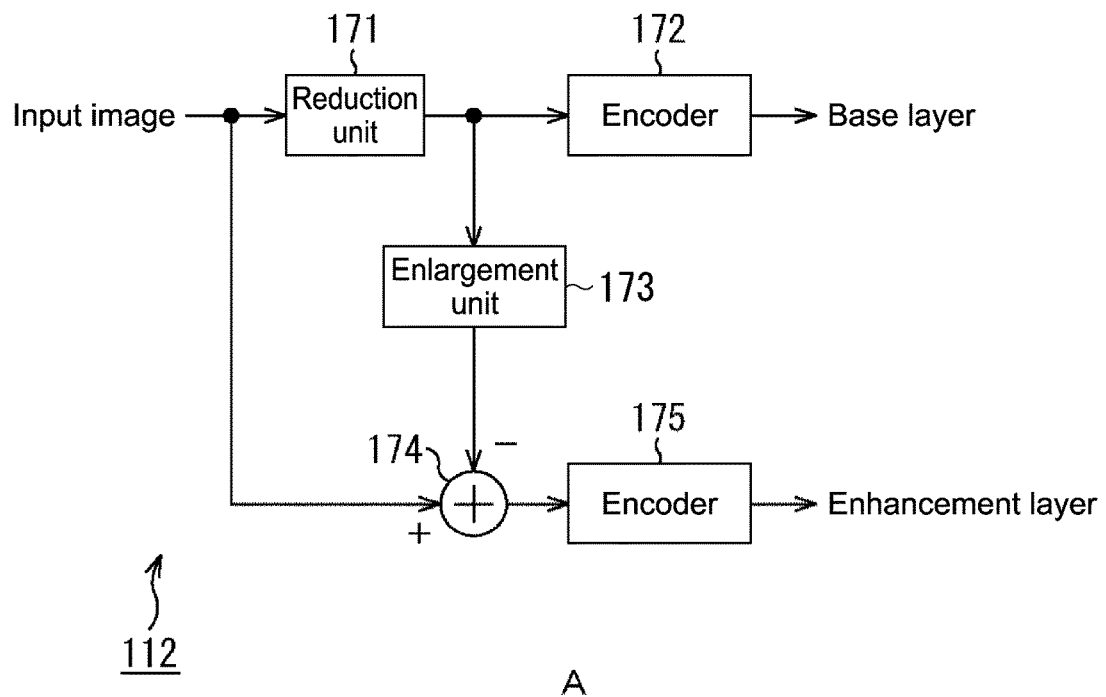
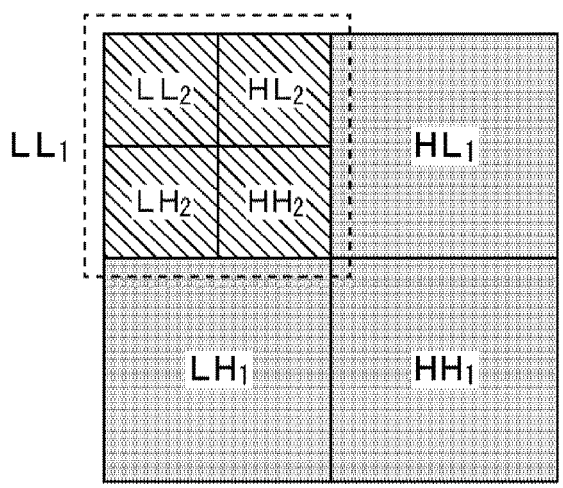
FIG.7

IMAGE PROCESSING APPARATUS AND IMAGE PROCESSING METHOD, IMAGE ENCODING APPARATUS AND IMAGE ENCODING METHOD, AND IMAGE DECODING APPARATUS AND IMAGE DECODING METHOD

CROSS REFERENCE TO RELATED APPLICATIONS

This application claims the benefit of Japanese Priority Patent Application JP 2014-044672 filed Mar. 7, 2014, the entire contents of which are incorporated herein by reference.

BACKGROUND

The present disclosure relates to an image processing apparatus and an image processing method, an image encoding apparatus and an image encoding method, and an image decoding apparatus and an image decoding method. In particular, the present disclosure relates to an image processing apparatus and an image processing method, an image encoding apparatus and an image encoding method, and an image decoding apparatus and an image decoding method, which can suppress the increase of the memory access band and memory capacity while preventing the image quality from being unnecessarily lowered.

In recent years, the resolution and quality of images handled by an electronic apparatus or the like have become higher and higher and the data amount of image data to be processed has increased. In general, with an apparatus that handles such images, image data is stored in a storage medium such as a frame memory for image processing, for example. However, the image data volume has increased, and hence a capacity of the memory and a band of a memory bus to be used for accessing the memory have become insufficient.

Therefore, in order to suppress the increase of the memory capacity necessary for storing the image data and the memory access band, methods of compressing and storing the image data have been conceived (e.g., see Japanese Patent Application Laid-open No. 2013-098873 (hereinafter, referred to as Patent Document 1), Japanese Patent Application Laid-open No. 2013-146038 (hereinafter, referred to as Patent Document 2), Japanese Patent Application Laid-open No. 2010-171609 (hereinafter, referred to as Patent Document 3), Japanese Patent Application Laid-open No. 2013-017014 (hereinafter, referred to as Patent Document 4), and Japanese Patent Application Laid-open No. 2010-141771 (hereinafter, referred to as Patent Document 5)).

SUMMARY

Regarding a reversible compression, processing is complicated and a sufficient compression ratio cannot be obtained in some cases. Thus, the reversible compression is not suitable as the above-mentioned compression. However, in the case of nonreversible compression, if the compression ratio is unnecessarily increased, there is a fear that the image quality is deteriorated. Therefore, it is desirable to compress the image data at a suitable compression ratio. However, the suitable compression ratio is varied depending on contents of image processing performed on the image data read from the memory and cannot be uniquely determined. Therefore, in the case where image data used in various types of image processing is stored, in the methods described in Patent Documents above, there is a fear that the image quality is unnecessarily lowered or the increase of the memory access band and memory capacity cannot be sufficiently suppressed.

In view of the above-mentioned circumstances, it is desirable to be able to suppress the increase of the memory access band and memory capacity while preventing the image quality from being unnecessarily lowered.

According to an embodiment of the present technology, there is provided an image processing apparatus including: an encoder configured to scalably encode image data; a write unit configured to cause storage via a predetermined bus to store encoded data that is the image data scalably encoded by the encoder; a read unit configured to read a desired layer of the encoded data from the storage via the bus; and a decoder configured to scalably decode the encoded data read from the storage by the read unit.

The read unit may be configured to read a layer of the encoded data in accordance with image processing with respect to the image data obtained by the decoder simply decoding the encoded data. The image processing apparatus may further include the bus and the storage.

The encoder may be configured to simply encode the image data by a fixed-length method in which a data length is fixed. The encoder may be configured to make a bit depth of the image data scalable and simply encode the image data.

The encoder may be configured to make a resolution of the image data scalable and simply encode the image data.

The encoder may be configured to make a frequency component of the image data scalable and simply encode the image data.

The encoder may include a plurality of single-layer encoders configured to simply encode mutually different layers of the image data and may be configured to scalably encode the image data by a multi-stage configuration of the single-layer encoders.

The decoder may include a plurality of single-layer decoders configured to simply decode mutually different layers of the encoded data and may be configured to scalably decode the encoded data by a multi-stage configuration of the single-layer decoders.

According to the embodiment of the present technology, there is also provided an image processing method including: scalably encoding image data; causing storage to store encoded data that is the scalably encoded image data via a predetermined bus; reading a desired layer of the encoded data from the storage via the bus; and scalably decoding the encoded data read from the storage.

According to another embodiment of the present technology, there is provided an image encoding apparatus including: a scalable encoder configured to scalably encode image data referred to when generating a prediction image; storage configured to store encoded data that is the image data scalably encoded by the scalable encoder; a read unit configured to read a desired layer of the encoded data from the storage; a scalable decoder configured to scalably decode the encoded data, which is read from the storage by the read unit, to generate reference image data; a prediction unit configured to perform prediction using the reference image data, which is obtained by the scalable decoder scalably decoding the encoded data, to generate the prediction image; and an encoder configured to encode image data using the prediction image generated by the prediction unit.

The read unit may be configured to read a layer according to a picture type of a current picture that is a processing target. The read unit may be configured to read a layer according to the purpose of use of the image data.

The scalable encoder may be configured to simply encode the image data by a fixed-length method in which a data length is fixed.

According to the other embodiment of the present technology, there is also provided an image encoding method including: scalably encoding image data referred to when generating a prediction image; storing encoded data that is the scalably encoded image data in storage; reading a desired layer of the encoded data from the storage; scalably decoding the encoded data read from the storage to generate reference image data; performing prediction using the reference image data, which is obtained by scalably decoding the encoded data, to generate the prediction image; and encoding image data using the generated prediction image.

According to still another embodiment of the present technology, there is provided an image decoding apparatus including: a scalable encoder configured to scalably encode image data referred to when generating a prediction image; storage configured to store encoded data that is the image data scalably encoded by the scalable encoder; a read unit configured to read a desired layer of the encoded data from the storage; a scalable decoder configured to scalably decode the encoded data, which is read from the storage by the read unit, to generate reference image data; a prediction unit configured to perform prediction using the reference image data, which is obtained by the scalable decoder scalably decoding the encoded data, to generate the prediction image; and a decoder configured to decode encoded data obtained by encoding image data, using the prediction image generated by the prediction unit.

The read unit may be configured to read a layer according to a picture type of a current picture that is a processing target. The read unit may be configured to read a layer according to the purpose of use of the image data.

The scalable encoder may be configured to simply encode the image data by a fixed-length method in which a data length is fixed.

According to the still another embodiment of the present technology, there is also provided an image decoding method including: scalably encoding image data referred to when generating a prediction image; storing encoded data that is the scalably encoded image data in the storage; reading a desired layer of the encoded data from the storage; scalably decoding the encoded data, which is read from the storage, to generate reference image data; performing prediction using the reference image data, which is obtained by scalably decoding the encoded data, to generate the prediction image; and decoding encoded data obtained by encoding image data, using the generated prediction image.

In the embodiment of the present technology, the image data is scalably encoded. The encoded data that is the scalably encoded image data is stored in the storage via the predetermined bus. The desired layer of the encoded data is read from the storage via the bus. The encoded data read from the storage is scalably decoded.

In the other embodiment of the present technology, the image data referred to when generating the prediction image is scalably encoded. The encoded data that is the scalably encoded image data is stored in the storage. The desired layer of the encoded data is read from the storage. The encoded data read from the storage is scalably decoded such that the reference image data is generated. Using the reference image data obtained by scalably decoding the encoded data, prediction is performed such that the prediction image is generated. Using the generated prediction image, the image data is encoded.

In the still another embodiment of the present technology, the image data referred to when generating the prediction image is scalably encoded. The encoded data that is the scalably encoded image data is stored in the storage. The desired layer of the encoded data is read from the storage. The encoded data read from the storage is scalably decoded such that the reference image data is generated. Using the reference image data obtained by scalably decoding the encoded data, prediction is performed such that the prediction image is generated. Using the generated prediction image, the encoded data obtained by encoding the image data is decoded.

According to the embodiments of the present disclosure, it is possible to store image data in a memory. In particular, at this time, it is possible to suppress the increase of the memory access band and memory capacity while preventing the image quality from being unnecessarily lowered.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a view showing a main configuration of a scalable encoder and how to scalably encode as an example;

FIG. 7 is a view showing a main configuration of the scalable encoder and how to scalably encode as still another example;

DETAILED DESCRIPTION OF EMBODIMENTS

Figure 1:
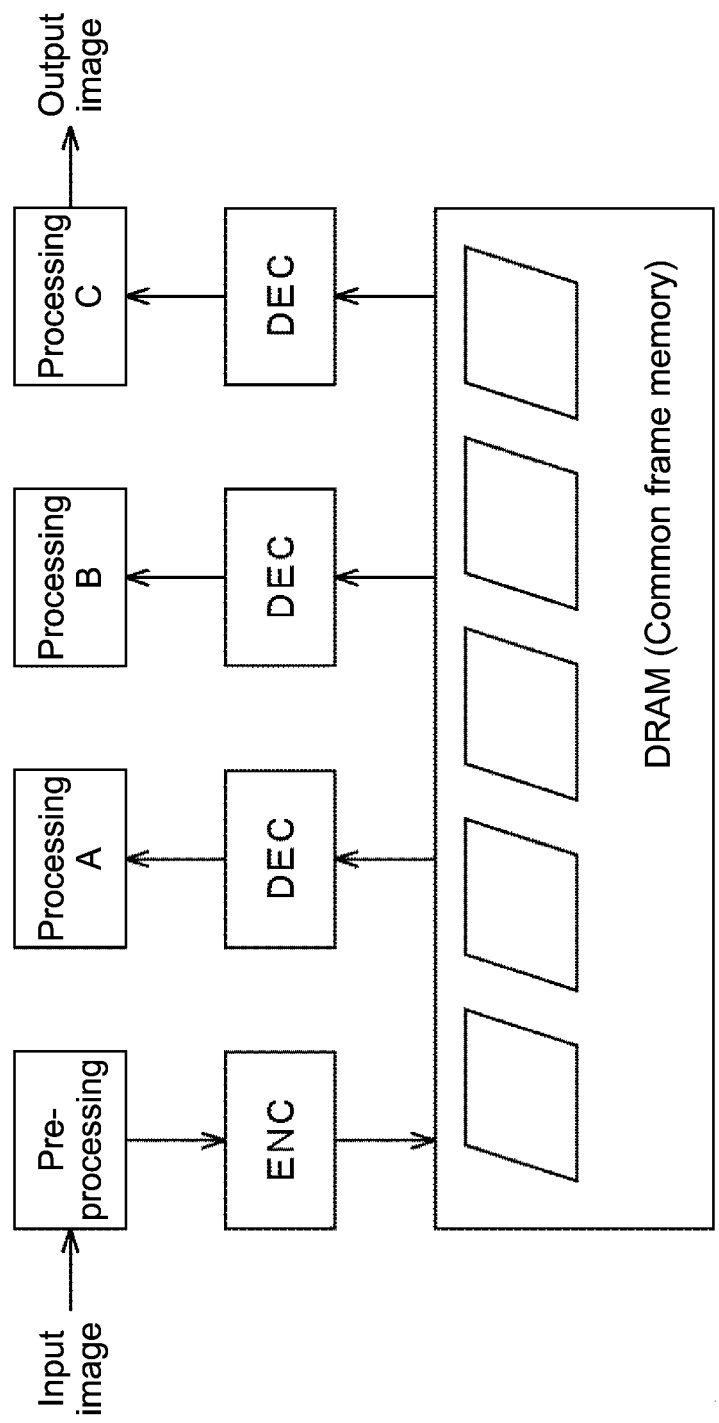
FIG. 1 is a view explaining a usage example of a common frame memory.

Hereinafter, embodiments for carrying out the present disclosure (hereinafter, referred to as embodiments) will be described. Note that descriptions thereof will be made in the following order.

1. First Embodiment (image processing apparatus)
2. Second Embodiment (television apparatus)
3. Third Embodiment (cellular phone)
4. Fourth Embodiment (image capturing apparatus)
5. Fifth Embodiment (video unit)
6. Sixth Embodiment (image encoding apparatus)
7. Seventh Embodiment (image decoding apparatus)
8. Eighth Embodiment (computer)

1. First Embodiment (Use of Common Frame Memory)

From the past, an electronic apparatus or the like that handles image data performs the following operations. Specifically, the image data is stored in a frame memory. The image data is read from the frame memory if necessary. Arbitrary processing, for example, image processing is performed on the image data. Then, the processed image data is returned to the frame memory. In this way, not only predetermined processing but also a wide variety of types of processing can be appropriately performed on the image data. In other words, the image data (frame memory) can be shared with various types of processing.

In recent years, the resolution and quality of images handled by the electronic apparatus or the like are increased. Thus, the data amount of the image data to be processed increases. Therefore, it is desirable to increase the capacity of the frame memory that stores the image data. Further, as the data amount of the image data increases, a usage amount of a band of a memory bus also increases in accessing the frame memory (reading and writing of image data). Therefore, it is also desirable to widen the band of the memory bus. Moreover, processing to be performed on the image data is more diverse. Thus, the amount of access to the frame memory also increases. Also for this reason, it is desirable to widen the band of the memory bus.

Increasing the capacity of the frame memory and widening the band of the memory bus take a high cost. Further, it is difficult to infinitely increase the capacity of the frame memory and widen the band of the memory bus due to limitations on hardware or the like. In view of this, for example, as in Patent Documents 1 to 5, there has been conceived a method of compressing the image data before storing it in the frame memory, to thereby suppress the increase of the memory capacity and memory access band necessary for storing the image data.

As the image compressing method, there are a reversible compression and a nonreversible compression. Regarding the reversible compression, processing is complicated and a sufficient compression ratio cannot be obtained in some cases. Thus, the reversible compression is not suitable as this compression. In contrast, regarding the nonreversible compression, processing is easy and a sufficient compression ratio can be easily obtained. However, in the case of nonreversible compression, the quality of a decoded image is deteriorated in comparison with the image before encoding. Therefore, if the compression ratio is unnecessarily increased, there is a fear that the image quality is unnecessarily deteriorated.

Therefore, it is desirable to compress the image data at a suitable compression ratio. However, the suitable compression ratio is varied depending on contents of processing performed on the image data read from the frame memory and cannot be uniquely determined. Therefore, in the case where image data used in various types of processing is stored (a plurality of types of processing share a frame memory), in the methods described in Patent Documents above, there is a fear that the image quality is unnecessarily lowered or the increase of the memory access band and memory capacity cannot be sufficiently suppressed.

For example, as shown in FIG. 1, if an input image is encoded (compressed) by an encoder (ENC) before stored in a dynamic random access memory (DRAM) that is the common frame memory, the band of the memory bus and the memory capacity that are used for storing data can be reduced. However, in the case where the encoded data is read from the DRAM and decoded by a decoder (DEC) and the decoded image data is subjected to processing A to processing C, the processing A to the processing C do not necessarily need the same amount of information (e.g., image quality and resolution).

For example, the following assumption will be made: the processing A is processing of detecting a person in an image; the processing B is processing of detecting a depth of an image; and the processing C is processing of outputting a result of processing, for example, parallax correction as an output image. In this case, it can be considered that the necessary amount of information of image data is highest in the processing C and lowest in the processing A.

In this case, if the compression ratio of the encoder (ENC) is set based on the amount of information necessary for the processing A, the amount of information necessary for the processing B or the processing C cannot be obtained. Otherwise, if the compression ratio of the encoder (ENC) is set based on the amount of information necessary for the processing C, the compression ratio is not sufficient for the processing A or the processing B (compression ratio can be still increased). Thus, it is not possible to sufficiently reduce the band of the memory bus and the usage amount of the memory capacity.

Figure 2:
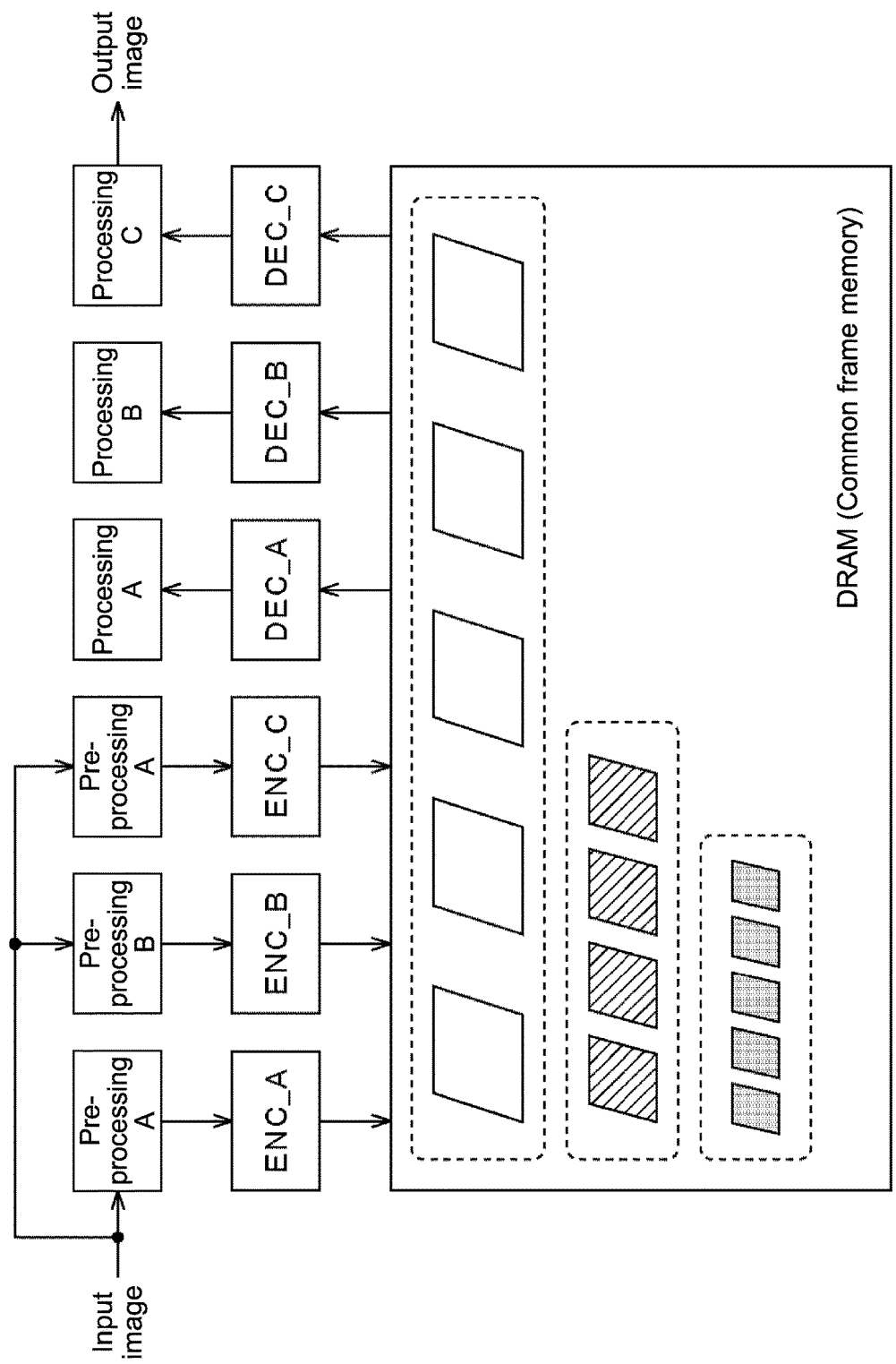
FIG. 2 is a view explaining another usage example of the common frame memory.

In view of this, for example, as shown in FIG. 2, an input image is encoded (compressed) based on the amount of information necessary for each of the processing A to the processing C before stored in the DRAM. Specifically, an encoder (ENC_A) compresses the input image at a compression ratio based on the amount of information necessary for the processing A. An encoder (ENC_B) compresses the input image at a compression ratio based on the amount of information necessary for the processing B. An encoder (ENC_C) compresses the input image at a compression ratio based on the amount of information necessary for the processing C. In this case, encoded data generated by each encoder is stored in the DRAM as shown in FIG. 2.

In the case of reading the image data (encoded data) of the DRAM to be used in the processing A, a decoder (DEC_A) reads and decodes the encoded data generated by the encoder (ENC_A). In the case of reading the image data (encoded data) of the DRAM to be used in the processing B, a decoder (DEC_B) reads and decodes the encoded data generated by the encoder (ENC_B). In the case of reading the image data (encoded data) of the DRAM to be used in the processing C, a decoder (DEC_C) reads and decodes the encoded data generated by the encoder (ENC_C). In this manner, the encoded data having the amount of information suitable for each processing can be read. Thus, it is possible to sufficiently reduce the usage amount of the band of the memory bus.

However, as shown in FIG. 2, a plurality of encoded data items of the same input image are stored in the DRAM, and hence there is a fear that the redundancy increases in comparison with the case shown in FIG. 1 and the usage amount of the memory capacity of the DRAM increases. Further, the number of times of writing data in the DRAM and a data transfer amount increase in comparison with the case shown in FIG. 1. Therefore, there is a fear that the usage amount of the band of the memory bus increases.

(Image Processing Apparatus)

In view of this, the following configuration is employed. Specifically, in this configuration, when the image data is written in the storage, the image data is scalably encoded and stored in the storage. When the image data is processed, a desired layer of the scalably encoded data is read from the storage and scalably decoded.

Note that the desired layer may be, for example, a layer in accordance with processing with respect to image data obtained by reading the encoded data from the storage and decoding the encoded data. Encoding/decoding the image data may be performed by a fixed-length method in which a data length is fixed.

Figure 3:
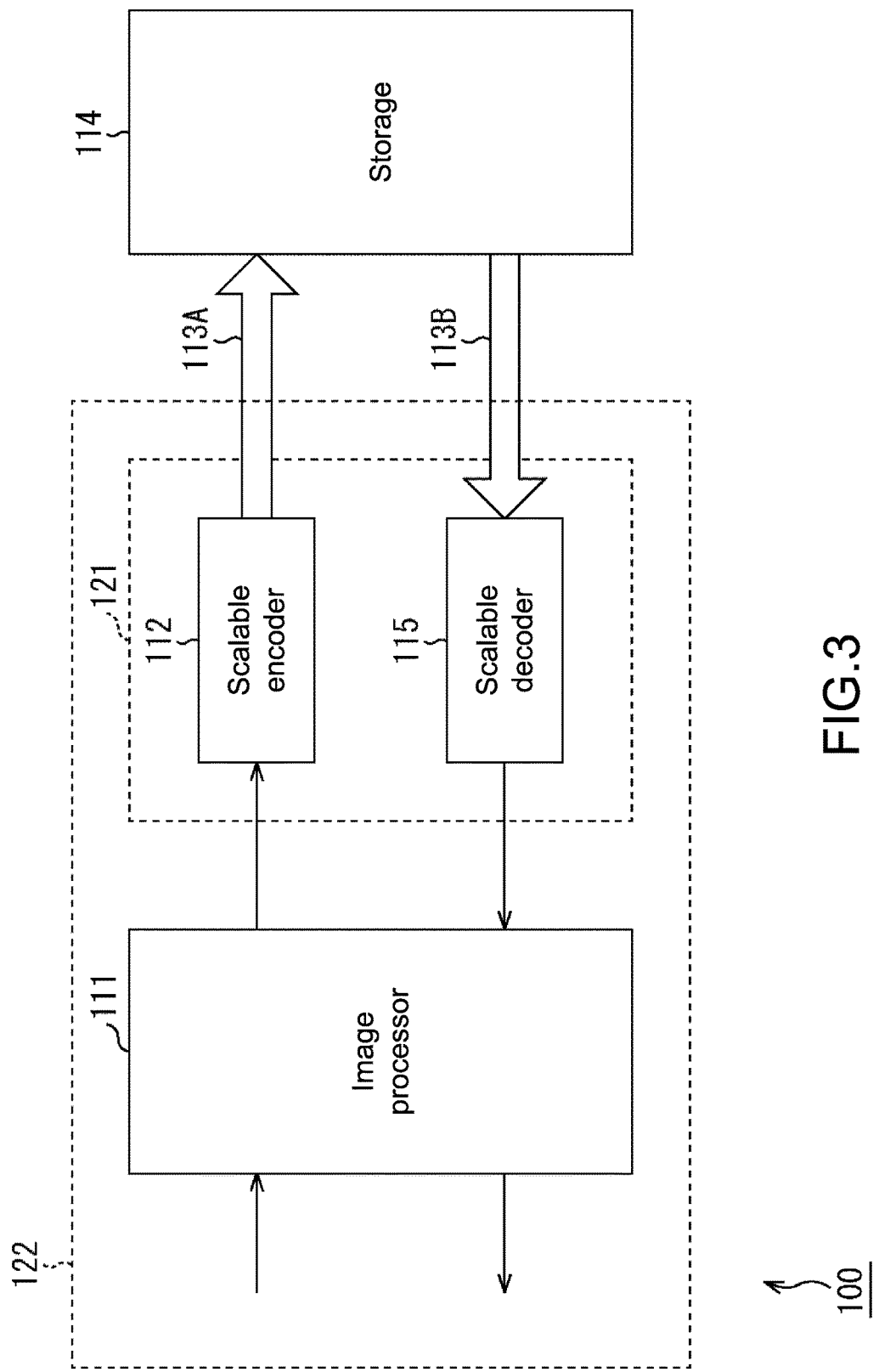
FIG. 3 is a block diagram showing a main configuration example of an image processing apparatus.

FIG. 3 is a block diagram showing an example of a configuration of an image processing apparatus according to an embodiment of an image processing apparatus to which the present technology is applied. An image processing apparatus 100 shown in FIG. 3 is an apparatus that subjects input image data to image processing.

As shown in FIG. 3, the image processing apparatus 100 includes an image processor 111, a scalable encoder 112, a memory bus 113A and a memory bus 113B, storage 114, and a scalable decoder 115.

The image processor 111 performs any image processing on image data. The image processor 111 supplies image data input from an outside to the scalable encoder 112 to store the image data in the storage 114. At this time, the image processor 111 may perform image processing on the image data before supplying the image data to the scalable encoder 112. The image processor 111 reads desired image data (encoded data) from the storage 114 via the scalable decoder 115 and performs any image processing on the image data. The image processor 111 may supply the processed image data to the scalable encoder 112 to be stored in the storage 114 again or may output the processed image data to an outside of the image processing apparatus 100.

The scalable encoder 112 scalably encodes (progressively codes) the image data supplied from the image processor 111. That is, the scalable encoder 112 layers the image data and encodes each layer. Any encoding method can be employed. For example, a fixed-length method in which a data length is fixed may be employed. With the fixed length, processing is easier in comparison with a variable length. Further, it is easier to increase the compression ratio. Moreover, it is also easier to manage the data when storing the data in the storage 114. Therefore, the fixed-length method is desirable.

More specifically, the scalable encoder 112 desirably performs scalable and simple encoding. The scalable and simple encoding means simple encoding with a scalability function. The simple encoding (also referred to as simple compression) means an image encoding technique for reducing the data transfer rate and the memory band. In the simple encoding, data is encoded (compressed) while keeping the subjective image quality at the same level. In general, the compression ratio in the simple encoding is lower than general-purpose encoding such as advanced video coding (AVC) because it is necessary to keep the subjective image quality at the same level (e.g., about 50%). By the scalable encoder 112 performing the above-mentioned simple encoding, it is possible to reduce the memory capacity and lower the transfer rate in data transmission.

By performing not the general-purpose encoding such as the AVC but the simple encoding, the scalable encoder 112 can encode (compress) the image data by simpler processing. That is, in comparison with the case of the general-purpose encoding, the scalable encoder 112 can perform encoding in a shorter time. The load of the encoding processing is reduced, and hence it is also possible to suppress the increase of the power consumption and manufacturing cost in comparison with the case of the general-purpose encoding.

In the case of simple encoding, the image data is encoded independently in units of blocks (without referring to surrounding blocks already encoded or decoded). Therefore, by the scalable encoder 112 performing such a simple compression, only necessary data (arbitrary block) can be read in any order (i.e., random access becomes possible) when the encoded data is read from the storage 114.

Therefore, it is possible to suppress the increase of bandwidth consumption (usage amount) of the memory bus 113B in reading the data. Further, in the case of simple encoding, the image data is encoded such that the amount of bit (bit length) after encoding is fixed. Thus, it becomes easy to manage data storage areas in the storage 114 and it is easier to read the data. That is, a data configuration easy to use can be provided for data processing. In particular, in the case of random access, the number of designations of addresses to be read increases. Therefore, due to the easier management of the data storage areas, this effect becomes more prominent.

Any specific method can be employed for the above-mentioned simple encoding. For example, a compression method using a differential pulse code modulation (DPCM) or a compression method using a one-dimensional discrete cosine transform (DCT) can be employed.

In the following, a description will be made assuming that scalable and simple encoding using the above-mentioned simple encoding (scalable encoding by at least fixed-length method) is performed. The scalable encoder 112 supplies encoded data of the layers, which is obtained by scalable encoding, to the storage 114 via the memory bus 113A for storing it.

The memory bus 113A is a bus (transmission medium) used for transmitting the encoded data from the scalable encoder 112 to the storage 114. The memory bus 113B is a bus (transmission medium) used for transmitting the encoded data from the storage 114 to the scalable decoder 115. Note that, in FIG. 3, although each of the memory bus 113A and the memory bus 113B is indicated by a single arrow, any number of buses can be actually used. For example, the memory bus 113A and the memory bus 113B may be a common bus (identical bus). In the following, when it is unnecessary to discriminate the memory bus 113A from the memory bus 113B, it will be referred to as a memory bus 113.

The storage 114 is a storage medium that stores the encoded data obtained by scalably encoding the image data. For example, the storage 114 functions as the frame memory. The storage 114 is configured by, for example, the DRAM.

The scalable decoder 115 reads a desired layer of the encoded data stored in the storage 114 via the memory bus 113B. The scalable decoder 115 subjects the read encoded data to scalable decoding that is a decoding method corresponding to scalable encoding performed by the scalable encoder 112. That is, the scalable decoder 115 decodes and combines read encoded data of the layers to generate image data (decoded image data) of a single layer. Any types of decoding methods can be employed as long as it corresponds to the encoding method of the scalable encoder 112. For example, the fixed-length method in which the data length is fixed may be employed.

Alternatively, for example, if the scalable encoder 112 performs scalable and simple encoding, the scalable decoder 115 may perform scalable and simple decoding. The scalable and simple decoding means a decoding method corresponding to the above-mentioned scalable encoding. The scalable and simple decoding means simple decoding with a scalability function. The simple decoding (also referred to as simple extension) means a decoding method corresponding to the above-mentioned simple encoding. As in the case of simple encoding, in the case of simple decoding, the encoded data can be decoded (extended) by simpler processing in comparison with a general-purpose decoding method such as the AVC.

In the following, a description will be made assuming that the scalable and simple decoding using such simple decoding (scalably decoding by at least fixed-length method). The scalable decoder 115 supplies the decoded image data, which is obtained by the scalably decoding, to the image processor 111.

As described above, the scalable encoder 112 and the scalable decoder 115 function as interfaces for the storage 114 (memory bus 113). The scalable encoder 112 and the scalable decoder 115 may be integrated as a scalable codec unit 121 that performs scalable encoding/decoding. The present technology is applicable to the scalable codec unit 121. That is, the scalable codec unit 121 may be employed as an embodiment of the image processing apparatus to which the present technology is applied and the image processor 111, the memory bus 113, and the storage 114 may be used as external components.

Alternatively, the image processor 111, the scalable encoder 112, and the scalable decoder 115 may be integrated into an image processing module 122. The present technology is applicable to the image processing module 122. That is, the image processing module 122 may be employed as an embodiment of the image processing apparatus to which the present technology is applied and the memory bus 113 and the storage 114 may be used as external components.

(Writing/Reading Data)

Figure 4:
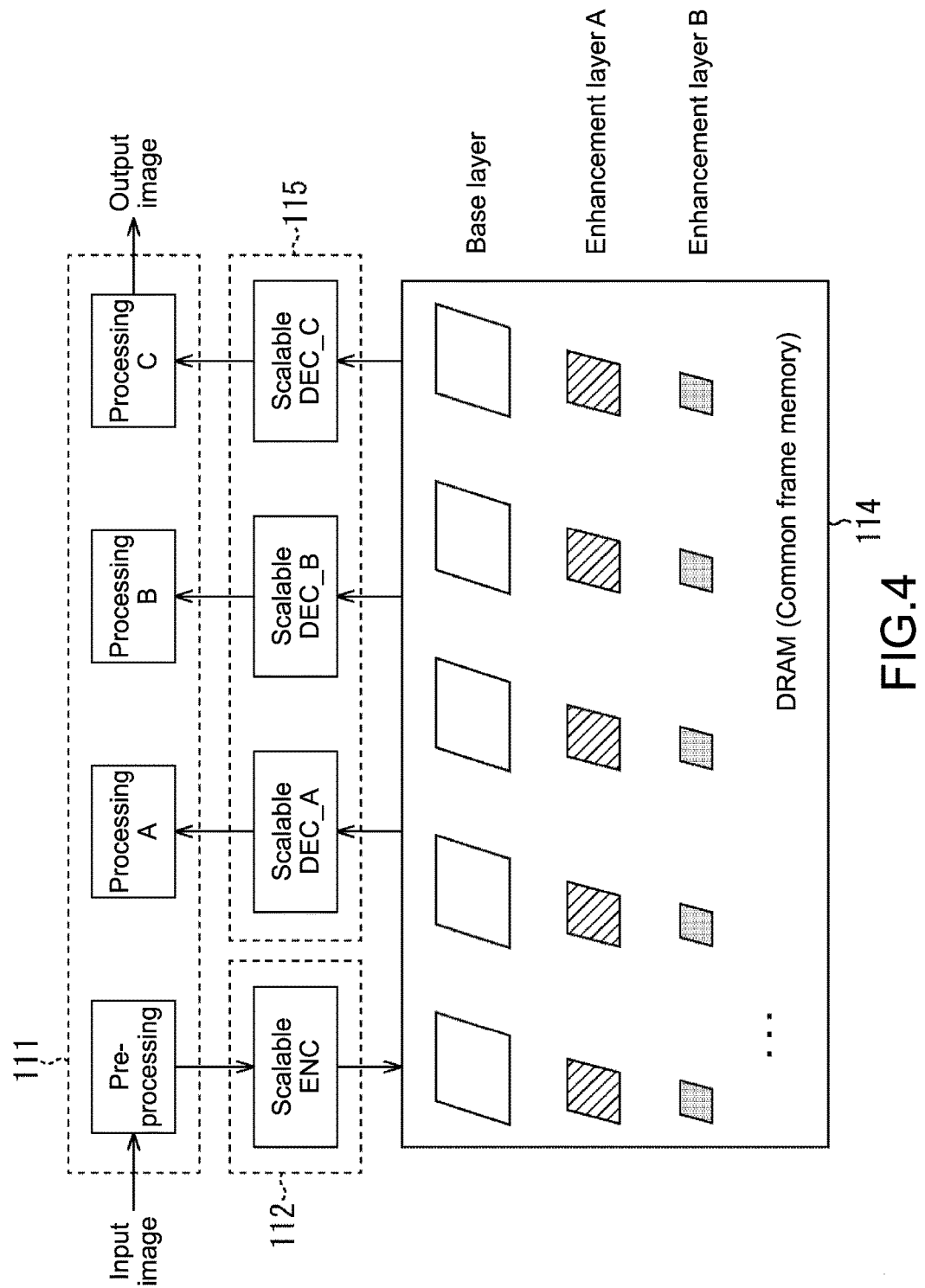
FIG. 4 is a view explaining how to access a memory as an example.

With the image processing apparatus 100 of FIG. 3, writing/reading the image data (encoded data) in/from the storage 114 are performed in a manner shown in FIG. 4, for example.

An input image is pre-processed by the image processor 111. Then, the input image is scalably and simply encoded by the scalable encoder 112 (scalable ENC). The input image is stored in the storage 114 (DRAM (common frame memory)). Thus, the image data is layered, encoded for each layer, and stored. In the example of FIG. 4, the image data is stored in the storage 114 as encoded data items of three layers that are a base layer, an enhancement layer A, and an enhancement layer B. Although this layering will be described later, the enhancement layer is configured by a difference between data before layered and data of a layer lower than the enhancement layer, and hence the redundancy of the encoded data of the layers is lower than in the case of FIG. 2. Therefore, it is possible to suppress the increase of the usage amount of the memory capacity of the storage 114 and the usage amount of the band of the memory bus 113.

For decoding, it is only necessary to read encoded data of a desired layer and a layer(s) lower than the desired layer. For example, in the case of performing the processing A, assuming that a layer from which the amount of information necessary for the processing A can be obtained is the base layer, the following operations are performed. Specifically, the scalable decoder 115 (scalable DEC_A) reads and simply decodes the encoded data of the base layer and supplies the obtained decoded image data (base layer) to the image processor 111. The image processor 111 subjects the decoded image data to the processing A.

For example, in the case of performing the processing B, assuming that a layer from which the amount of information necessary for the processing B can be obtained is the enhancement layer A, the following operations are performed. Specifically, the scalable decoder 115 (scalable DEC_B) reads and simply decodes the encoded data of the base layer and the enhancement layer A and supplies the obtained decoded image data (combination of base layer and enhancement layer A) to the image processor 111. The image processor 111 subjects the decoded image data to the processing B.

For example, in the case of performing the processing C, assuming that a layer from which the amount of information necessary for the processing B can be obtained is the enhancement layer B, the following operations are performed. Specifically, the scalable decoder 115 (scalable DEC_B) reads and simply decodes the encoded data of the base layer, the enhancement layer A, and the enhancement layer B and supplies the obtained decoded image data (combination of base layer, enhancement layer A, and enhancement layer B) to the image processor 111. The image processor 111 subjects the decoded image data to the processing B and outputs the processed image data as an output image.

By using the scalable and simple encoding/scalable and simple decoding in this manner, without increasing the usage amount of the memory capacity of the storage 114 and the usage amount of the band of the memory bus 113 as in the example of FIG. 2, it is possible to read the encoded data having the amount of information suitable to each type of processing. Thus, it is possible to sufficiently reduce the usage amount of the band of the memory bus. That is, the image processing apparatus 100 can suppress the increase of the memory access band and memory capacity while preventing the image quality from being unnecessarily lowered.

(Scalable Encoding)

In scalable encoding, the layering is performed such that each layer is configured by a difference between data before layered and data of a layer lower than the layer and the redundancy of the data of the layers does not increase. In such scalable encoding, any parameter of the image data can be made scalable.

For example, the bit depth of the image data may be made scalable. That is, the layering may be performed with respect to the bit depth of the image data. "A" of FIG. 5 shows a main configuration example of the scalable encoder 112 in this case. In the example shown in "A" of FIG. 5, the input image is layered into two layers that are the base layer and the enhancement layer.

As shown in "A" of FIG. 5, in this case, the scalable encoder 112 includes an encoder 151, a decoder 152, an arithmetic unit 153, and an encoder 154. The encoder 151 simply encodes the base layer. For example, the encoder 151 extracts higher-order bits of pixel data from input image data (discards lower-order bits) and performs simple encoding. The encoded data is supplied to the storage 114 as the encoded data of the base layer.

The decoder 152 simply decodes the encoded data of the base layer to generate the decoded image data of the base layer (corresponding to higher-order bits of input image data). The arithmetic unit 153 subtracts the decoded image data of the base layer from the input image data. That is, the arithmetic unit 153 extracts lower-order bits of the pixel data from the input image data.

The encoder 154 subjects the enhancement layer to the same processing as the encoder 151 (simple encoding). That is, the encoder 154 extracts, from the difference data obtained by the arithmetic unit 153 (corresponding to lower-order bits of input image data), higher-order bits of the pixel data (higher-order bits of difference data, that is, higher-order bits among lower-order bits of input image data) and simply encodes the higher-order bits. The encoded data is supplied to the storage 114 as the encoded data of the enhancement layer.

By performing the scalable and simple encoding in this manner, as shown in "B" of FIG. 5, higher-order bits of the pixel data of the image data (in example of "B" of FIG. 5, five higher-order bits) are set as the base layer and middle bits (in example of "B" of FIG. 5, sixth and seventh bits from highest-order bit) are set as the enhancement layer. Then, they are simply encoded for each layer. In other words, the bit depth of the image data is made scalable and the encoding is performed.

Figure 6:
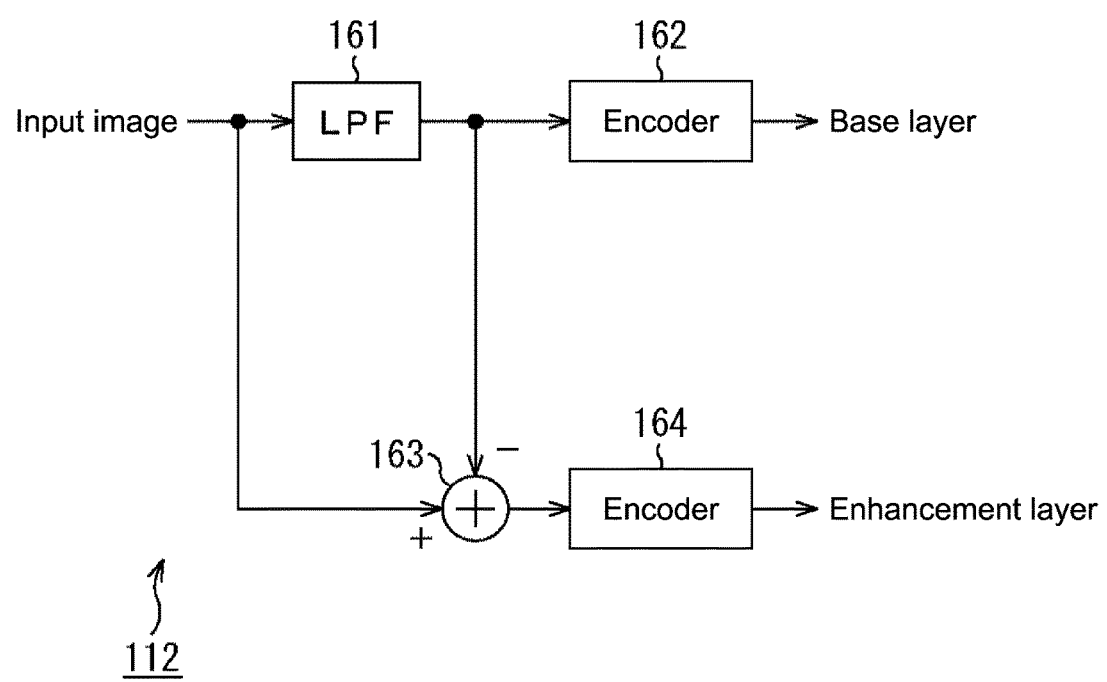
FIG. 6 is a view showing a main configuration of the scalable encoder and how to scalably encode as another example.

Alternatively, for example, a frequency component of the image data may be made scalable. That is, the layering may be performed with respect to the frequency component of the image data. FIG. 6 shows a main configuration example of the scalable encoder 112 in this case. In the example shown in FIG. 6, the input image is layered into two layers that are the base layer and the enhancement layer.

As shown in FIG. 6, in this case, the scalable encoder 112 includes an LPF 161, an encoder 162, an arithmetic unit 163, and an encoder 164. The LPF 161 means a low-pass filter and extracts predetermined low frequency components of the input image. The encoder 162 simply encodes the low frequency components of the input image data that are extracted by the LPF 161. The encoded data is supplied to the storage 114 as the encoded data of the base layer.

The arithmetic unit 163 subtracts, from the input image data, the low frequency components of the input image data that are extracted by the LPF 161. That is, predetermined high frequency components of the input image data are extracted.

The encoder 164 performs the same processing as the encoder 162. That is, the encoder 162 simply encodes the difference data (high frequency components of input image data) obtained by the arithmetic unit 163. The encoded data is supplied to the storage 114 as the encoded data of the enhancement layer.

By performing the scalable and simple encoding in this manner, the low frequency components of the image data are set as the base layer and the high frequency components are set as the enhancement layer. Then, they are simply encoded for each layer. That is, the frequency components of the image data are made scalable and the encoding is performed.

Note that any method of separating the frequency components of the input image data can be used. For example, instead of using the low-pass filter as described above, a high-pass filter or band-pass filter may be used. Alternatively, for example, orthogonal transformation such as discrete cosine transform (DCT) and wavelet transformation may be used.

Still alternatively, for example, a resolution of the image data may be made scalable. That is, the layering may be performed with respect to the resolution of the image data. "A" of FIG. 7 shows a main configuration example of the scalable encoder 112 in this case. In the example shown in "A" of FIG. 7, the input image is layered into two layers that are the base layer and the enhancement layer.

As shown in "A" of FIG. 7, in this case, the scalable encoder 112 includes a reduction unit 171, an encoder 172, an enlargement unit 173, an arithmetic unit 174, and an encoder 175. The reduction unit 171 reduces the input image to have a predetermined resolution. Any reduction method can be used. For example, the orthogonal transformation such as the wavelet transformation may be used. By subjecting the image data to the wavelet transformation, as shown in "B" of FIG. 7, a low frequency component ($LL_1$) is obtained. The low frequency component is, in other words, an image obtained by reducing the resolution of the image before the wavelet transformation (i.e., reduction image). The encoder 172 simply encodes the reduction image of the input image that is obtained by the reduction unit 171. The encoded data is supplied to the storage 114 as the encoded data of the base layer.

The enlargement unit 173 enlarges the image size of the image data of the base layer that is obtained by the reduction unit 171 to have the same size as the input image data. The arithmetic unit 174 subtracts the enlarged image data of the base layer from the input image data. With this, difference data between the input image data and the image data of the base layer can be obtained.

The encoder 175 performs the same processing as the encoder 172. That is, the encoder 175 simply encodes the difference data obtained by the arithmetic unit 174. The encoded data is supplied to the storage 114 as the encoded data of the enhancement layer.

By performing the scalably and simply encoding in this manner, as shown in "B" of FIG. 7, the reduction image of the image data is set as the base layer and the difference between the input image and the reduction image is set as the enhancement layer. They are simply encoded for each layer. That is, the resolution of the image data is made scalable and the encoding is performed.

Note that the enlargement processing by the enlargement unit 173 is merely processing of modifying the image size and not increasing the resolution. That is, it is processing for determining the difference between the input image data and the image data of the base layer, which may be omitted if unnecessary. For example, if the wavelet transformation is used, both of the image data of the base layer and the image data of the enhancement layer can be obtained. The encoder 172 and the encoder 175 only need to simply encode the image data of the layers. For example, in the example of "B" of FIG. 7, the encoder 172 simply encodes the low frequency component $LL_1$ (reduction image) of the input image and the encoder 175 simply encodes high frequency components $LH_1$, $HL_1$, and $HH_1$ of the input image (i.e., difference between input image and reduction image). In this case, the enlargement unit 173 and the arithmetic unit 174 can be omitted.

Of course, the parameter made scalable is not limited to the examples above. The configuration of the scalable encoder 112 is not limited to the example above.

In each of the examples above, the scalable encoder 112 includes a plurality of single-layer encoders that simply encodes mutually different layers of the image data and the image data is scalably encoded by the multi-stage configuration of the single-layer encoders. With this configuration, for example, it becomes possible to share hardware resources, for example, realize the single-layer encoders using the same circuit (realize the plurality of single-layer encoders by time-dividing and using the same circuit). Therefore, it is possible to suppress the increase of the circuit scale.

(Scalably Decoding)

The scalably decoding can be performed by any method as long as it is a method corresponding to the above-mentioned scalable encoding.

Figure 8:
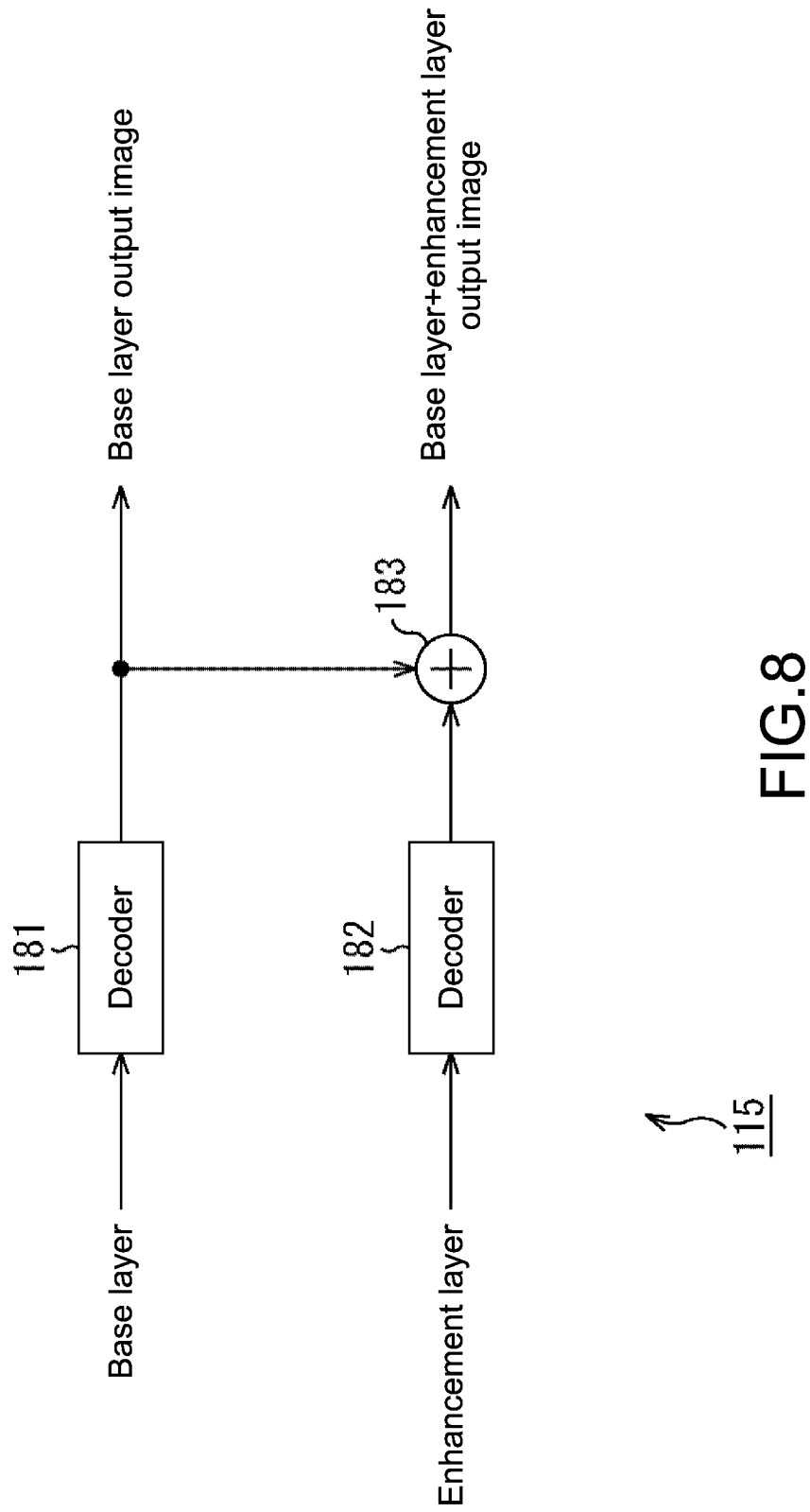
FIG. 8 is a view showing a main configuration of a scalable decoder and how to scalably decode as another example.

FIG. 8 shows a main configuration example of the scalable decoder 115. In the example shown in FIG. 8, the encoded data layered into two layers that are the base layer and the enhancement layer is simply decoded.

As shown in FIG. 8, in this case, the scalable decoder 115 includes a decoder 181, a decoder 182, and an arithmetic unit 183. The decoder 181 simply decodes the encoded data of the base layer by a decoding method corresponding to the encoding method. The decoder 182 subjects the enhancement layer to the same processing as the decoder 181. That is, the decoder 182 simply decodes the encoded data of the enhancement layer. The arithmetic unit 183 combines the decoded image data of the base layer that is obtained by the decoder 181 and the decoded image data of the enhancement layer that is obtained by the decoder 182.

For example, for obtaining the decoded image data of the base layer, the scalable decoder 115 simply decodes the encoded data of the base layer through the decoder 181 and outputs the obtained decoded image data (output image of base layer).

For example, for obtaining the decoded image data of the enhancement layer (i.e., combination of decoded image data of base layer and decoded image data of enhancement layer), the scalable decoder 115 simply decodes the encoded data of the base layer through the decoder 181 and simply decodes the encoded data of the enhancement layer through the decoder 182. Then, the scalable decoder 115 combines the decoded image data of the layers through the arithmetic unit 183 and outputs the obtained decoded image data (output image of base layer+enhancement layer).

In this manner, the scalable decoder 115 can obtain the decoded image data of the desired layer.

Of course, the parameter made scalable is not limited to the examples above. The configuration of the scalable decoder 115 is not limited to the example above.

In each of the examples above, the scalable decoder 115 includes a plurality of single-layer decoders that simply decodes mutually different layers of the encoded data and simply decodes the encoded data by the multi-stage configuration of the single-layer decoders. With this configuration, for example, it becomes possible to share hardware resources, for example, realize the single-layer decoders using the same circuit (realize the plurality of single-layer decoders by time-dividing and using the same circuit). Therefore, it is possible to suppress the increase of the circuit scale.

(Flow of Storage Processing/Read Processing)

Figure 9:
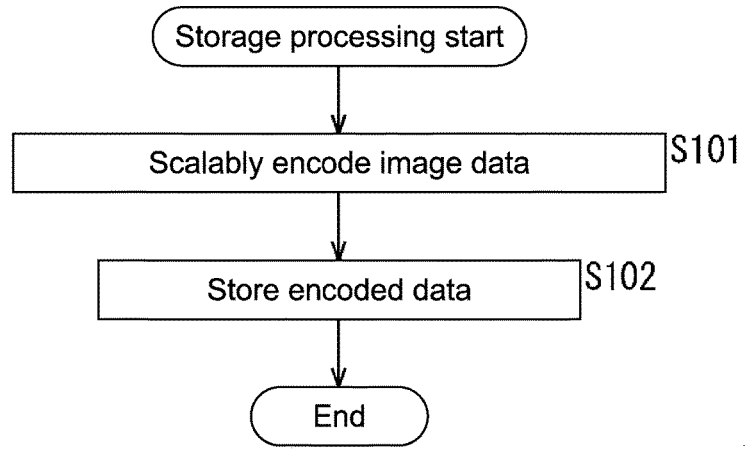
FIG. 9 is a flowchart explaining an example of a flow of storage processing.

Next, with reference to a flowchart of FIG. 9, an example of a flow of storage processing performed when storing the image data in the storage 114 will be described.

The storage processing is started. Then, the scalable encoder 112 scalably encodes (scalably and simply encodes) image data in Step 101.

In Step 102, the scalable encoder 112 supplies layers of the encoded data (scalably encoded image data) obtained by the processing of Step 101 to the storage 114 via the memory bus 113A for storing them. The processing of Step 102 ends. Then, the storage processing ends.

Figure 10:
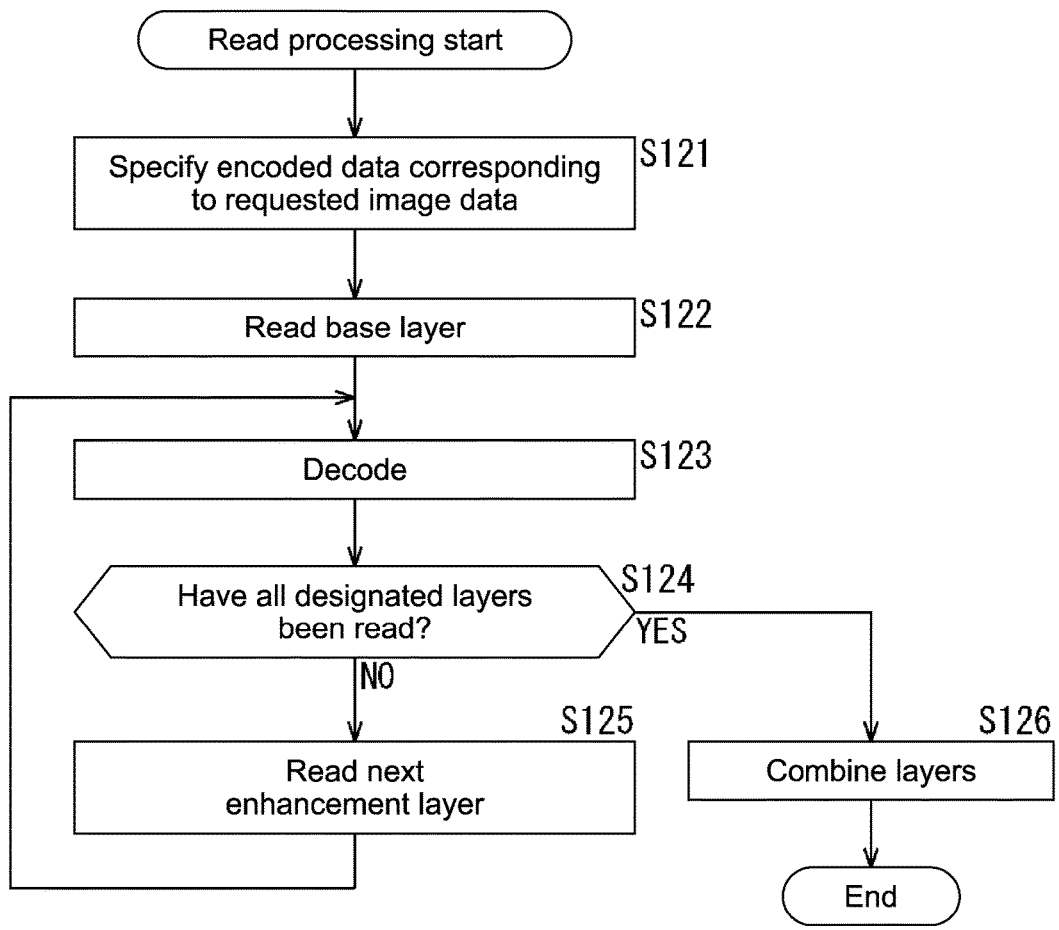
FIG. 10 is a flowchart explaining an example of a flow of read processing.

Next, with reference to a flowchart of FIG. 10, an example of a flow of read processing performed when reading the image data from the storage 114 will be described.

The read processing is started. Then, in Step 121, the scalable decoder 115 specifies encoded data out of the encoded data stored in the storage 114, which corresponds to image data requested by the image processor 111, for example. In Step 122, the scalable decoder 115 reads a base layer of the encoded data specified in Step 121 via the memory bus 113B.

In Step 123, the scalable decoder 115 decodes (simply decodes) the encoded data of the base layer read from the storage 114 by the processing of Step 122.

In Step 124, the scalable decoder 115 judges whether or not all the layers designated by the image processor 111 have been read, for example. If it is judged that a layer not read yet is present, the processing proceeds to Step 125.

In Step 125, the scalable decoder 115 reads encoded data of a next enhancement layer from the storage 114 via the memory bus 113. When the encoded data is read, the processing returns to Step 123 and the subsequent processing is repeated. That is, the processing of Steps 123 to 125 is repeated with respect to the read encoded data of the enhancement layer. That is, in Step 123, the encoded data of the enhancement layer, which is read in Step 125, is decoded (simply decoded).

In Step 124, if it is judged that all the designated layers have been read, the processing proceeds to Step 126. In Step 126, the scalable decoder 115 combines the decoded image data of the layers to generate decoded image data of a requested layer (decoded image data in which data items from base layer to requested layer are combined). The scalable decoder 115 supplies the generated decoded image data to the image processor 111. The processing of Step 126 ends. Then, the read processing ends.

By performing each type of processing in the above-mentioned manner, the image processing apparatus 100 can suppress the increase of the memory access band and memory capacity while preventing the image quality from being unnecessarily lowered.

2. Second Embodiment (Television Apparatus)

The present technology is applicable not only to the image processing apparatus 100 described in the first embodiment but also to various apparatuses. Hereinafter, some of the application examples will be described.

Figure 11:
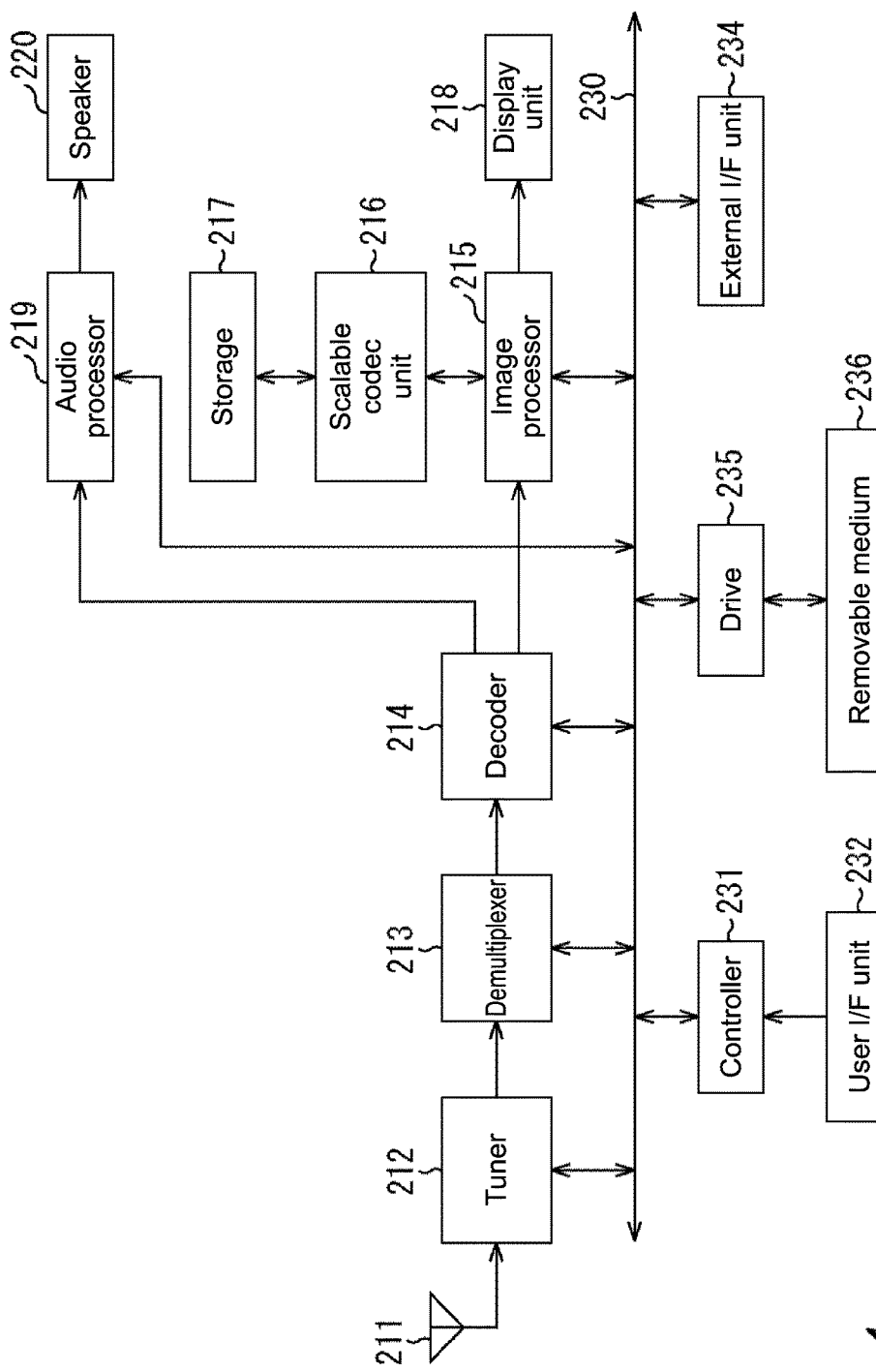
FIG. 11 is a block diagram showing a main configuration example of a television apparatus.

For example, the present technology is applicable to a television apparatus. FIG. 11 shows an example of a schematic configuration of a television apparatus to which the present technology is applied. A television apparatus 200 includes an antenna 211, a tuner 212, a demultiplexer 213, a decoder 214, an image processor 215, a scalable codec unit 216, storage 217, a display unit 218, an audio processor 219, a speaker 220, a bus 230, a controller 231, a user interface (I/F) unit 232, an external interface (I/F) unit 234, and a drive 235.

The tuner 212 extracts a signal of a desired channel from a broadcast signal received via the antenna 211 and demodulates the extracted signal. The demultiplexer 213 demultiplexes a video stream and an audio stream of a program as a viewing target from an encoded bit stream.

The audio stream is decoded by the decoder 214, subjected to predetermined signal processing as an audio signal by the audio processor 219, and output from the speaker 220 as audio.

The video stream is decoded by the decoder 214, subjected to the image processing as image data by the image processor 215, and displayed on the display unit 218 as an image.

The controller 231 controls the processors of the television apparatus 200 via the bus 230. The controller 231 includes a processor such as a central processing unit (CPU) and a memory such as a random access memory (RAM) and a read only memory (ROM). The memory stores programs executed by the CPU, program data, EPG data, data obtained via a network, and the like. The programs stored in the memory are read in by the CPU and executed in starting the television apparatus 200, for example. By executing the programs, the CPU controls an operation of the television apparatus 200 according to an operation signal input from the user interface unit 232, for example.

The user interface unit 232 includes, for example, a button and a switch for the user to operate the television apparatus 200 and a reception unit for a remote control signal. The user interface unit 232 detects an operation made by the user via these components and generates an operation signal. The user interface unit 232 outputs the generated operation signal to the controller 231.

The external interface unit 234 is an interface for connecting the television apparatus 200 with an external apparatus or a network. For example, the video stream or the audio stream received via the external interface unit 234 may be supplied to and decoded by the decoder 214. Alternatively, the audio data or image data decoded by the decoder 214, the audio signal processed by the audio processor 219, or the image data processed by the image processor 215 may be transmitted to another apparatus via the external interface unit 234.

The drive 235 drives a removable medium 236 such as a magnetic disc, an optical disc, a magneto-optical disc, and a semiconductor memory.

The scalable codec unit 216 is a processor having the same function as the scalable codec unit 121, to which the present technology is applied. That is, the scalable codec unit 216 includes the same components as the scalable codec unit 121, for example, the scalable encoder 112 and the scalable decoder 115 and performs the same processing. The storage 217 is a processor having the same function as the storage 114. The storage 217 has the same components as the storage 114 and performs the same processing.

That is, the scalable codec unit 216 scalably encodes the image data to be subjected to the image processing by the image processor 215 and causes the storage 217 to store it. The scalable codec unit 216 reads requested layers of the encoded data requested by the image processor 215, for example, from the storage 217. The scalable codec unit 216 decodes and combines the layers. The scalable codec unit 216 supplies the obtained decoded image data to the image processor 215.

With the above-mentioned configuration, the television apparatus 200 can suppress the increase of the memory access band and memory capacity while preventing the image quality from being unnecessarily lowered.

3. Third Embodiment (Cellular Phone)

Figure 12:
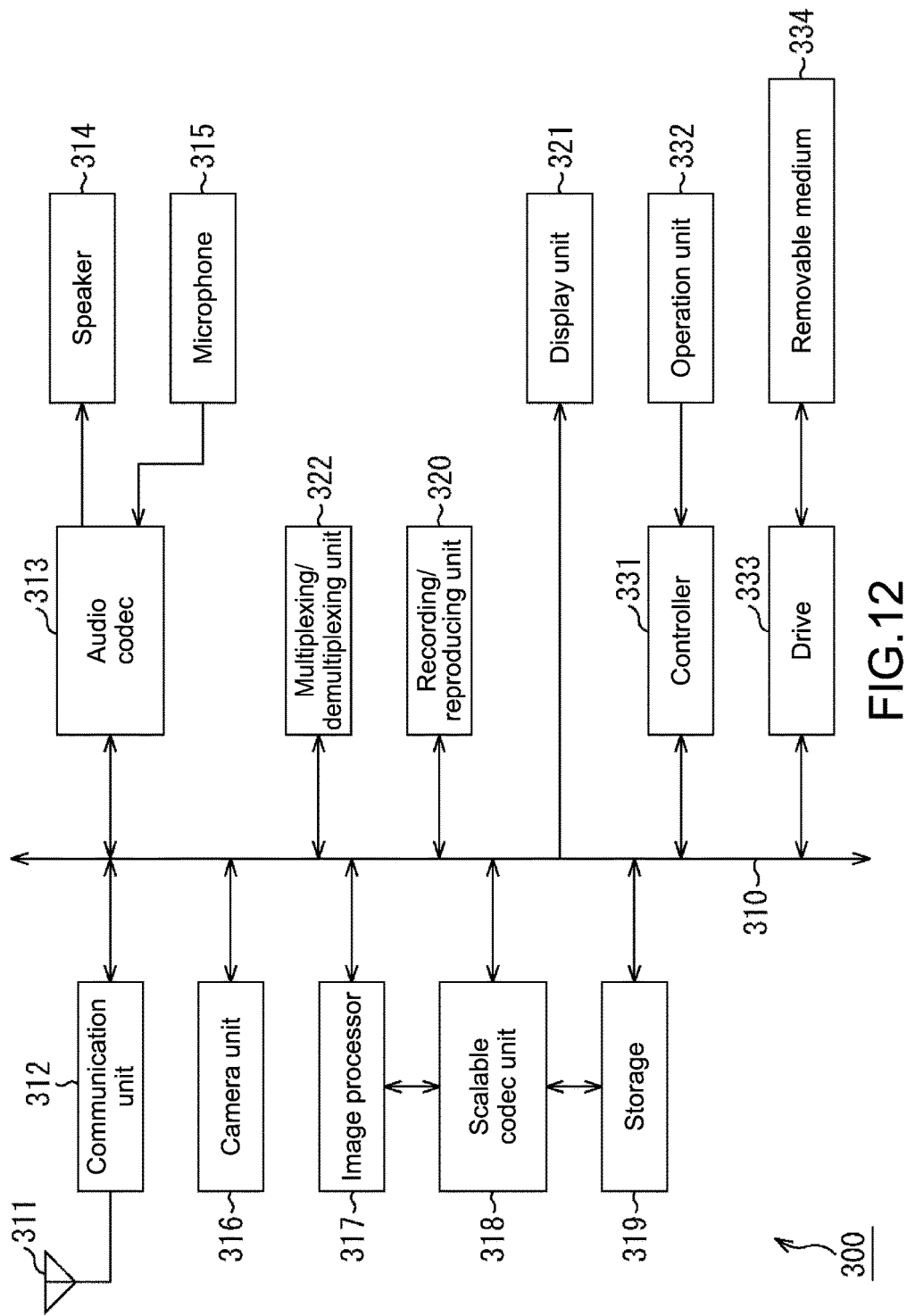
FIG. 12 is a block diagram showing a main configuration example of a cellular phone.

The present technology is also applicable to a cellular phone. FIG. 12 shows an example of a schematic configuration of a cellular phone to which the present technology is applied. The cellular phone 300 includes a bus 310, an antenna 311, a communication unit 312, an audio codec 313, a speaker 314, a microphone 315, a camera unit 316, an image processor 317, a scalable codec unit 318, storage 319, a recording/reproducing unit 320, a display unit 321, a multiplexing/demultiplexing unit 322, a controller 331, an operation unit 332, and a drive 333.

In the case of a voice call mode, a received voice is received and demodulated by the communication unit 312 via the antenna 311, decoded by the audio codec 313, and output from the speaker 314. A transmitted voice is input from the microphone 315, encoded by the audio codec 313, modulated by the communication unit 312, and transmitted via the antenna 311.

In the case where image data is received from the outside on a data communication mode, the image data is received and demodulated by the communication unit 312 via the antenna 311 and subjected to the image processing by the image processor 317. The obtained image is displayed on the display unit 321. Alternatively, the image data may be encoded in the recording/reproducing unit 320 and stored in a built-in storage medium (or the removable medium 334), for example.

In the case where the recording/reproducing unit 320 transmits image data stored in a recording medium or the removable medium 334 to the outside, the image data may be read and decoded by the recording/reproducing unit 320. The decoded image data may be subjected to the image processing by the image processor 317 and encoded by the recording/reproducing unit 320. The encoded image data may be modulated by the communication unit 312 and transmitted via the antenna 311. Alternatively, an image of the image data subjected to the image processing by the image processor 317 may be displayed on the display unit 321.

In the case where a subject is imaged and the captured image data is recoded, the subject is imaged and the captured image data is generated by the camera unit 316. The captured image data is subjected to the image processing by the image processor 317 and recorded in the recording/reproducing unit 320. Alternatively, an image of the image data subjected to the image processing may be displayed on the display unit 321. Still alternatively, the image data subjected to the image processing may be encoded by the recording/reproducing unit 320, modulated by the communication unit 312, and transmitted via the antenna 311.

The controller 331 controls the processors of the cellular phone 300 via the bus 310. The controller 331 includes a processor such as the CPU and a memory such as the RAM and the ROM. The memory stores programs executed by the CPU, program data, data obtained via a network, and the like. The programs stored in the memory are, for example, read in and executed by the CPU in starting the cellular phone 300. By executing the programs, the CPU controls an operation of the cellular phone 300 according to an operation signal input from the operation unit 332, for example.

The operation unit 332 includes, for example, a button and a switch for the user to operate the cellular phone 300 and a reception unit for a remote control signal. The operation unit 332 detects an operation made by the user via these components and generates an operation signal. The operation unit 332 outputs the generated operation signal to the controller 331.

The drive 333 drives a removable medium 334 such as a magnetic disc, an optical disc, a magneto-optical disc, and a semiconductor memory.

The scalable codec unit 318 is a processor having the same function as the scalable codec unit 121, to which the present technology is applied. That is, the scalable codec unit 318 includes the same components as the scalable codec unit 121, for example, the scalable encoder 112 and the scalable decoder 115 and performs the same processing. The storage 319 is a processor having the same function as the storage 114. The storage 319 has the same components as the storage 114 and performs the same processing.

That is, the scalable codec unit 318 scalably encodes the image data to be subjected to the image processing by the image processor 317 and causes the storage 319 to store it. The scalable codec unit 318 reads requested layers of the encoded data requested by the image processor 317, for example, from the storage 319. The scalable codec unit 318 decodes and combines the layers. The scalable codec unit 318 supplies the obtained decoded image data to the image processor 317.

With the above-mentioned configuration, the cellular phone 300 can suppress the increase of the memory access band and memory capacity while preventing the image quality from being unnecessarily lowered.

4. Fourth Embodiment (Image Capturing Apparatus)

Figure 13:
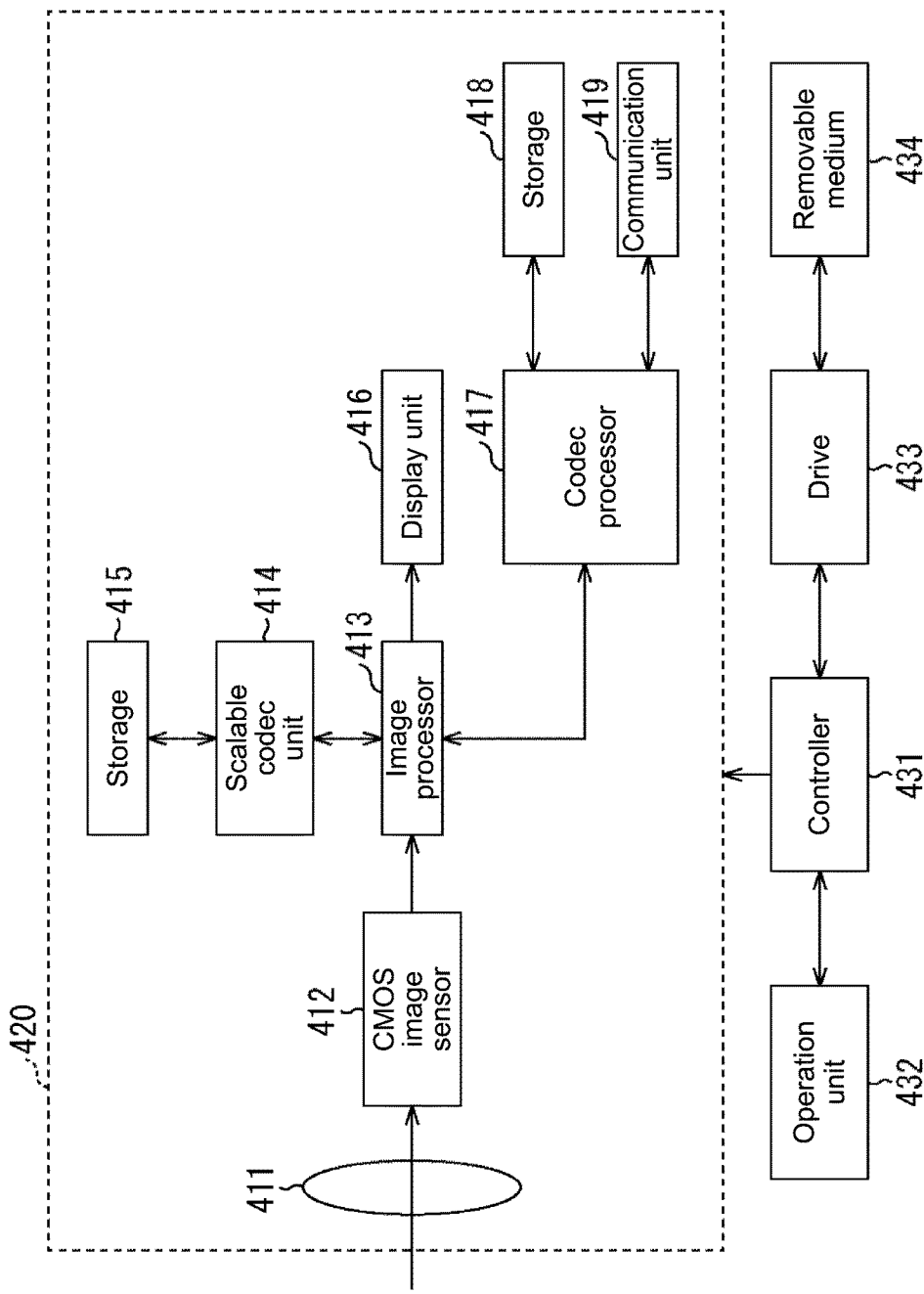
FIG. 13 is a block diagram showing a main configuration example of an image capturing apparatus.

The present technology is also applicable to an image capturing apparatus. FIG. 13 shows an example of a schematic configuration of an image capturing apparatus to which the present technology is applied. An image capturing apparatus 400 includes an optical block 411, a complementary metal oxide semiconductor (CMOS) image sensor 412, an image processor 413, a scalable codec unit 414, storage 415, a display unit 416, a codec processor 417, storage 418, a communication unit 419, a controller 431, an operation unit 432, and a drive 433.

The optical block 411 includes a focus lens, a diaphragm mechanism, and the like. The optical block 411 forms an optical image of the subject in an imaging plane of the CMOS image sensor 412. The CMOS image sensor 412 converts the optical image formed in the imaging plane into an image signal as an electric signal by photoelectric conversion. The CMOS image sensor 412 outputs the image signal to the image processor 413. Instead of the CMOS image sensor 412, an image sensor of a charge coupled device (CCD) may be used.

The image processor 413 performs the image processing on an image signal obtained by the CMOS image sensor 412, that is, the captured image data. As the captured image data subjected to the image processing, the image is displayed on the display unit 416, for example. The captured image data subjected to the image processing is supplied to the codec processor 417, encoded, and stored in the storage 418 as the encoded data. Alternatively, the encoded data may be transmitted to another apparatus via the communication unit 419.

Alternatively, the encoded data of the image data may be obtained from the other apparatus via the communication unit 419 and stored in the storage 418. At this time, the codec processor 417 may decode and reencode the encoded data if necessary. Alternatively, the codec processor 417 may decode the encoded data obtained by the communication unit 419. Then, the image processor 413 subjects the decoded data to the image processing and the display unit 416 may display the obtained image.

The controller 431 controls the processors of the image capturing apparatus 400, which are surrounded by a dotted line 420, and the drive 433. The controller 431 includes a processor such as the CPU and a memory such as the RAM and the ROM. The memory stores programs executed by the CPU, program data, data obtained via a network, and the like. The programs stored in the memory are, for example, read in and executed by the CPU in starting the image capturing apparatus 400. By executing the programs, the CPU controls an operation of the image capturing apparatus 400 according to an operation signal input from the operation unit 432, for example.

The operation unit 432 includes, for example, a button and a switch for the user to operate the image capturing apparatus 400 and a reception unit for a remote control signal. The operation unit 432 detects an operation made by the user via these components and generates an operation signal. The operation unit 432 outputs the generated operation signal to the controller 431.

The drive 433 drives a removable medium 434 such as a magnetic disc, an optical disc, a magneto-optical disc, and a semiconductor memory.

The scalable codec unit 414 is a processor having the same function as the scalable codec unit 121, to which the present technology is applied. That is, the scalable codec unit 414 includes the same components as the scalable codec unit 121, for example, the scalable encoder 112 and the scalable decoder 115 and performs the same processing. The storage 415 is a processor having the same function as the storage 114. The storage 415 has the same components as the storage 114 and performs the same processing.

That is, the scalable codec unit 414 scalably encodes the image data to be subjected to the image processing by the image processor 413 and causes the storage 415 to store it. The scalable codec unit 414 reads requested layers of the encoded data requested by the image processor 413, for example, from the storage 415. The scalable codec unit 414 decodes and combines the layers. The scalable codec unit 414 supplies the obtained decoded image data to the image processor 413.

With the above-mentioned configuration, the image capturing apparatus 400 can suppress the increase of the memory access band and memory capacity while preventing the image quality from being unnecessarily lowered.

5. Fifth Embodiment (Video Unit)

Figure 14:
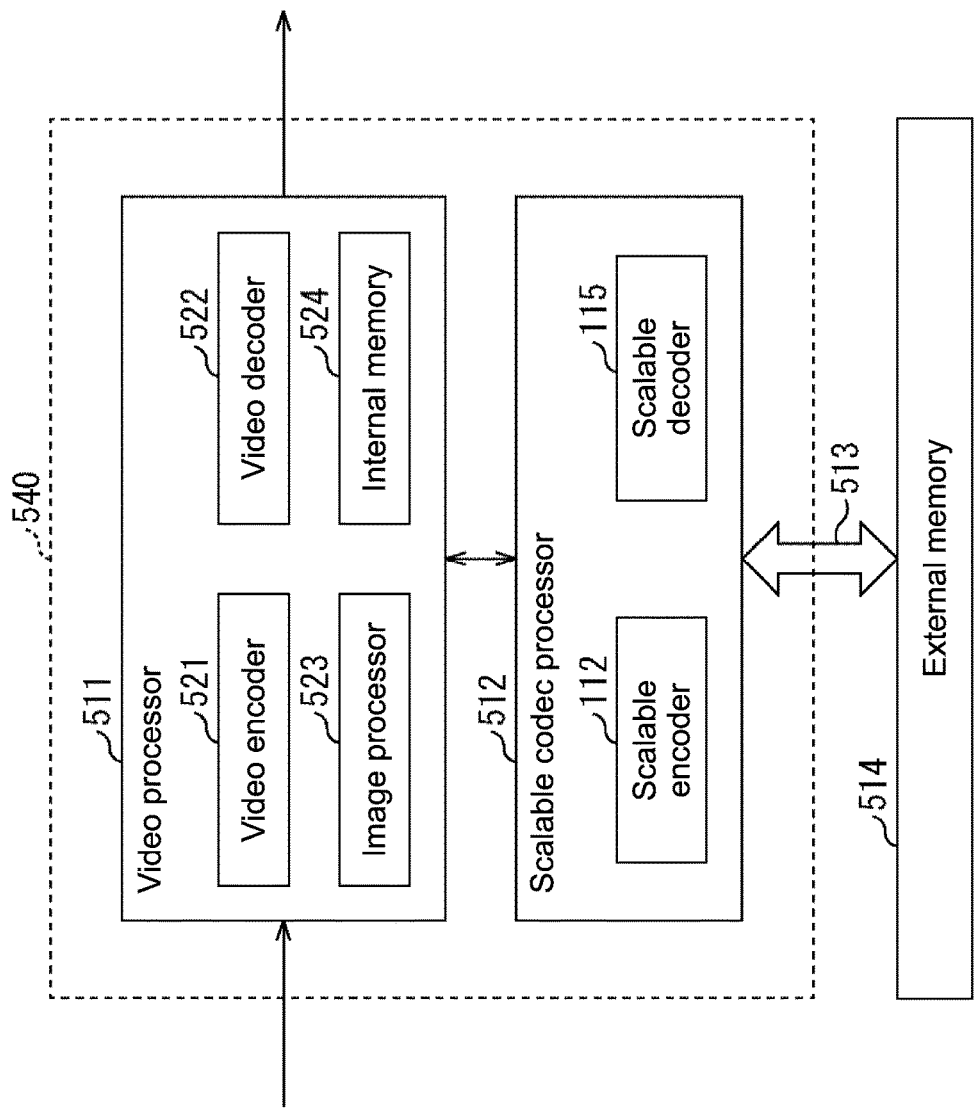
FIG. 14 is a block diagram showing a main configuration example of a video unit.

The present technology is also applicable to a video unit. FIG. 14 shows an example of a schematic configuration of the video unit to which the present technology is applied. In recent years, electronic apparatuses have more and more functions. For example, in the case of bending or providing some of them in the development or manufacture, the electronic apparatuses are embodied as those having a single function. In addition, there are often cases where the electronic apparatuses are embodied as single units each having a plurality of functions, combining a plurality of components having related functions.

A video unit 500 shown in FIG. 14 is multi-functionalized as such. Specifically, the video unit 500 is obtained by combining a device having a function of image processing (e.g., encoding and decoding) with devices having other functions relating to the image processing function.

As shown in FIG. 14, the video unit 500 includes a video processor 511, a scalable codec processor 512, a memory bus 513, and an external memory 514.

The video processor 511 subjects input image data to the image processing. The video processor 511 outputs the image data subjected to the image processing. In the example of FIG. 14, the video processor 511 includes a video encoder 521, a video decoder 522, an image processor 523, and an internal memory 524. The video encoder 521 encodes image data. The video decoder 522 decodes the encoded data of the image data. The image processor 523 subjects the image data to the image processing. The internal memory 524 is, for example, high-speed and small-capacity storage such as a static random access memory (SRAM). The internal memory 524 is used in processing for the video encoder 521, the video decoder 522, the image processor 523, and the like. It should be noted that the internal memory 524 has a small capacity, and hence cannot be used as a large-capacity frame memory or the like. In such a case, the external memory 514 is used.

The scalable codec processor 512 is a processor having the same function as the scalable codec unit 121, to which the present technology is applied. That is, the scalable codec processor 512 has the same configuration as the scalable codec unit 121, for example, the scalable encoder 112 and the scalable decoder 115 and performs the same processing. The memory bus 513 is the same bus as the memory bus 113. The external memory 514 is the same storage as the storage 114.

That is, the scalable codec processor 512 scalably encodes the image data subjected to the image processing by the video processor 511 (e.g., image processor 523). The scalable codec processor 512 supplies the encoded data to the external memory 514 via the memory bus 513 for storing it. Further, the scalable codec processor 512 reads requested layers of the encoded data requested by the video processor 511 (e.g., image processor 523), for example, from the external memory 514 via the memory bus 513. The scalable codec processor 512 decodes and combines the layers. The scalable codec processor 512 supplies the obtained decoded image data to the video processor 511 (e.g., image processor 523).

With the above-mentioned configuration, the video unit 500 can suppress the increase of the memory access band and memory capacity while preventing the image quality from being unnecessarily lowered.

Note that the video processor 511 and the scalable codec processor 512 may be integrated as a video module 540. The present technology is applicable to the video module 540. That is, the video module 540 may be employed as an embodiment of the image processing apparatus to which the present technology is applied and the memory bus 513 and the external memory 514 may be used as external components.

6. Sixth Embodiment (Image Encoding Apparatus)

Figure 15:
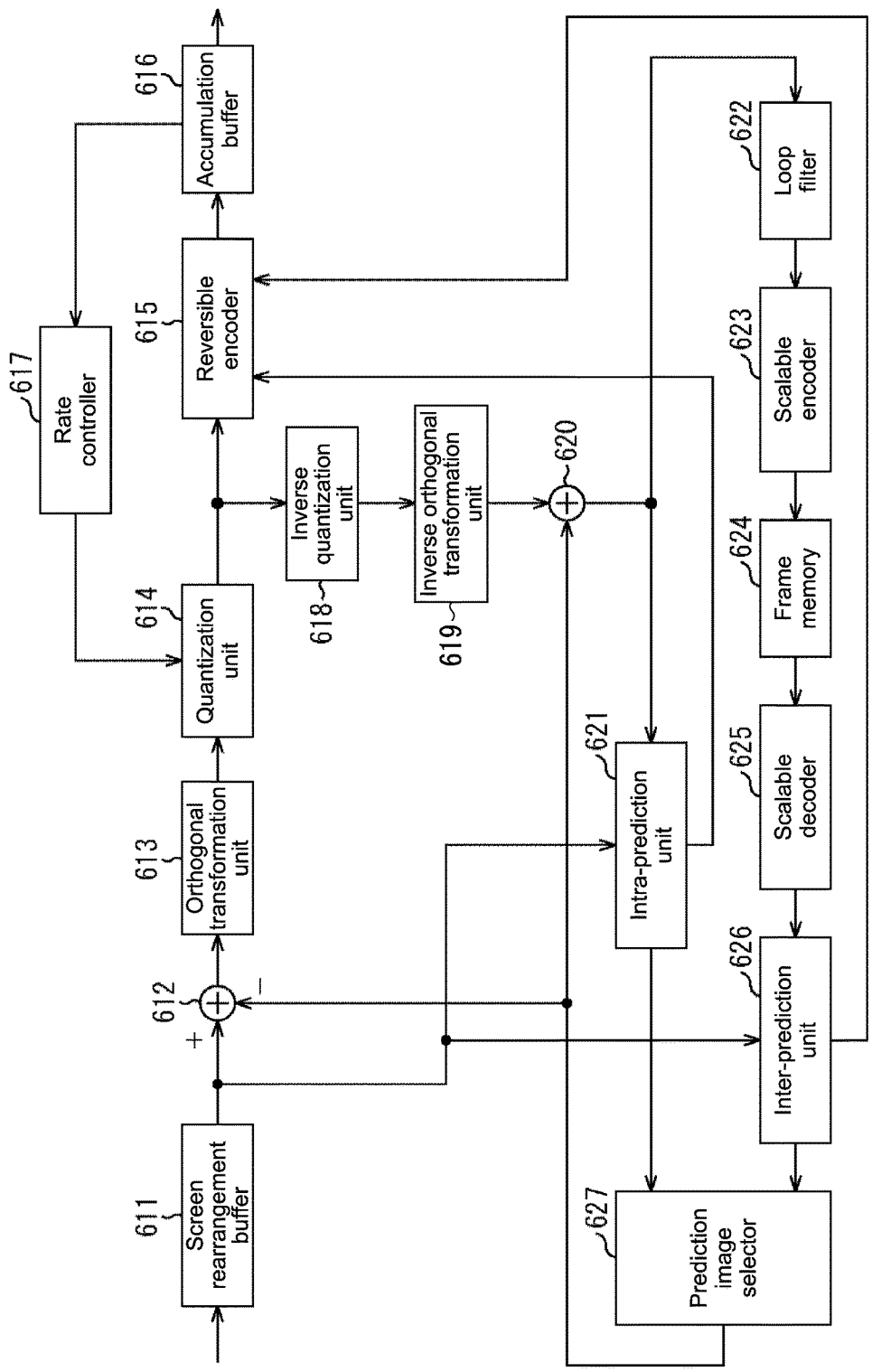
FIG. 15 is a block diagram showing a main configuration example of an image encoding apparatus.

The present technology is also applicable to image encoding in which encoding is performed using a reference image, for example, as in moving picture experts group (MPEG), advanced video coding (AVC), or high efficiency video coding (HEVC). FIG. 15 is a block diagram showing an example of a configuration of an image encoding apparatus as an embodiment of the image processing apparatus to which the present technology is applied. An image encoding apparatus 600 shown in FIG. 15 generates, for example, a prediction image using a reference image and encodes image data using the prediction image. At this time, the image encoding apparatus 600 causes the frame memory to temporarily store image data used as the reference image.

As shown in FIG. 15, the image encoding apparatus 600 includes a screen arrangement buffer 611, an arithmetic unit 612, an orthogonal transformation unit 613, a quantization unit 614, a reversible encoder 615, an accumulation buffer 616, a rate controller 617, an inverse quantization unit 618, and an inverse orthogonal transformation unit 619. The image encoding apparatus 600 further includes an arithmetic unit 620, an intra-prediction unit 621, a loop filter 622, a scalable encoder 623, a frame memory 624, a scalable decoder 625, an inter-prediction unit 626, and a prediction image selector 627.

The screen arrangement buffer 611 stores images of frames of the input image data in a display order. The screen arrangement buffer 611 rearranges the images of the frames stored in the display order in the order of frames for encoding according to group of picture (GOP). The screen arrangement buffer 611 supplies the images rearranged in the order of frames to the arithmetic unit 612. The screen arrangement buffer 611 also supplies the images rearranged in the order of frames to the intra-prediction unit 621 and the inter-prediction unit 626.

The arithmetic unit 612 subtracts, from an image read from the screen arrangement buffer 611, a prediction image supplied from the intra-prediction unit 621 or the inter-prediction unit 626 via the prediction image selector 627. The arithmetic unit 612 supplies the obtained difference information (residual data) to the orthogonal transformation unit 613. For example, in the case of an image subjected to intra-encoding, the arithmetic unit 612 subtracts, from the image read from the screen arrangement buffer 611, the prediction image supplied from the intra-prediction unit 621. Otherwise, for example, in the case of an image subjected to inter-encoding, the arithmetic unit 612 subtracts, from the image read from the screen arrangement buffer 611, the prediction image supplied from the inter-prediction unit 626.

The orthogonal transformation unit 613 subjects the residual data supplied from the arithmetic unit 612 to the orthogonal transformation such as a discrete cosine transform or a Karhunen-Loeve transform. The orthogonal transformation unit 613 supplies a transformation coefficient obtained by the orthogonal transformation to the quantization unit 614.

The quantization unit 614 quantizes the transformation coefficient supplied from the orthogonal transformation unit 613. The quantization unit 614 sets a quantization parameter based on information on a target value of a code amount supplied from the rate controller 617 and quantizes the transformation coefficient. The quantization unit 614 supplies the quantized transformation coefficient to the reversible encoder 615.

The reversible encoder 615 encodes the transformation coefficient quantized by the quantization unit 614 according to any encoding method. The coefficient data has been quantized under the control of the rate controller 617, and hence the code amount becomes the target value set by the rate controller 617 (or approximates the target value).

The reversible encoder 615 obtains information indicating the mode of the intra-prediction and the like from the intra-prediction unit 621. The reversible encoder 615 obtains information indicating the mode of the inter-prediction, difference motion vector information, and the like from the inter-prediction unit 626.

The reversible encoder 615 encodes various types of information by any encoding method to be a part of header information of the encoded data (also referred to as encoded stream) (to be multiplexed). The reversible encoder 615 supplies the encoded data obtained by the encoding to the accumulation buffer 616 for accumulating it.

Examples of the encoding method of the reversible encoder 615 may include variable-length encoding and arithmetic encoding. Examples of the variable-length encoding may include context-adaptive variable length coding (CAVLC) according to the H.264/AVC standard. Examples of the arithmetic encoding may include context-adaptive binary arithmetic coding (CABAC).

The accumulation buffer 616 temporarily stores the encoded data supplied from the reversible encoder 615. The accumulation buffer 616 outputs the retained encoded data to an outside of the image encoding apparatus 600 at a predetermined timing. That is, the accumulation buffer 616 also serves as a transmitter that transmits the encoded data.

The rate controller 617 controls, based on a code amount of the encoded data accumulated in the accumulation buffer 616, the rate of the quantization operation of the quantization unit 614 such that no overflow or underflow occurs.

The transformation coefficient quantized by the quantization unit 614 is also supplied to the inverse quantization unit 618. The inverse quantization unit 618 inversely quantizes the quantized transformation coefficient by a method corresponding to the quantization of the quantization unit 614. The inverse quantization unit 618 supplies the transformation coefficient obtained by the inverse quantization to the inverse orthogonal transformation unit 619.

The inverse orthogonal transformation unit 619 inversely orthogonally transforms the transformation coefficient supplied from the inverse quantization unit 618 by a method corresponding to the orthogonal transformation processing of the orthogonal transformation unit 613. The inverse orthogonal transformation unit 619 supplies the inversely orthogonally transformed output (restored residual data) to the arithmetic unit 620.

The arithmetic unit 620 adds, to the restored residual data, which is supplied from the inverse orthogonal transformation unit 619, the prediction image from the intra-prediction unit 621 or the inter-prediction unit 626 via the prediction image selector 627. The arithmetic unit 620 obtains a locally reconstructed image (hereinafter, referred to as reconstruction image). The reconstruction image is supplied to the loop filter 622 or the intra-prediction unit 621.

The intra-prediction unit 621 performs intra-prediction for generating a prediction image by using a pixel value in a processing-target picture that is the reconstruction image supplied from the arithmetic unit 620 as the reference image. The intra-prediction unit 621 performs the intra-prediction on a plurality of intra-prediction modes prepared in advance.

The intra-prediction unit 621 generates prediction images on all the intra-prediction modes that can be candidates. The intra-prediction unit 621 evaluates a cost function value of each prediction image, using the input image supplied from the screen arrangement buffer 611 and selects an optimal mode. When selecting the optimal intra-prediction mode, the intra-prediction unit 621 supplies the prediction image generated on the optimal mode to the prediction image selector 627.

As described above, the intra-prediction unit 621 appropriately supplies intra-prediction mode information or the like indicating the employed intra-prediction mode to the reversible encoder 615 for encoding it.

The loop filter 622 includes a deblocking filter, an adaptive loop filter, or the like. The loop filter 622 appropriately performs filtering processing on the reconstruction image supplied from the arithmetic unit 620. For example, the loop filter 622 subjects the reconstruction image to deblocking filter filtering processing, to thereby remove block distortion of the reconstruction image. Further, for example, the loop filter 622 performs loop filter processing using a Wiener filter on a result of the deblocking filtering processing (reconstruction image from which block distortion has been removed), to thereby improve the image quality.

Note that the loop filter 622 may further perform any other filtering processing on the reconstruction image. Additionally, if necessary, the loop filter 622 may supply information of a filter coefficient or the like used in the filtering processing to the reversible encoder 615 for encoding it.

The loop filter 622 causes the frame memory 624 via the scalable encoder 623 to store a result of the filtering processing (hereinafter, referred to as decoded image).

The inter-prediction unit 626 performs inter-prediction processing (motion prediction processing and compensation processing), using the input image supplied from the screen arrangement buffer 611 and the reference image supplied from the frame memory 624 via the scalable decoder 625. More specifically, the inter-prediction unit 626 performs motion compensation processing corresponding to a motion vector detected by motion prediction as the inter-prediction processing to generate a prediction image (inter-prediction image information). The inter-prediction unit 626 performs such inter-prediction on a plurality of inter-prediction modes prepared in advance.

The inter-prediction unit 626 generates prediction images on all the inter-prediction modes that can be candidates. The inter-prediction unit 626 evaluates a cost function value of each prediction image, using the input image supplied from the screen arrangement buffer 611, information on the generated differential motion vector, and the like and selects an optimal mode. When selecting the optimal inter-prediction mode, the inter-prediction unit 626 supplies the prediction image generated on the optimal mode to the prediction image selector 627.

The inter-prediction unit 626 supplies information indicating the employed inter-prediction mode, information necessary for performing processing on the inter-prediction mode in decoding the encoded data, and the like to the reversible encoder 615 for encoding them. Examples of the necessary information may include information on generated differential motion vector and a flag indicating an index of a prediction motion vector as prediction motion vector information.

The prediction image selector 627 selects a supply source of the prediction image to be supplied to the arithmetic unit 612 and the arithmetic unit 620. For example, in case of intra-encoding, the prediction image selector 627 selects the intra-prediction unit 621 as the supply source for the prediction image. Then, the prediction image selector 627 supplies the prediction image supplied from the intra-prediction unit 621 to the arithmetic unit 612 and the arithmetic unit 620. Otherwise, for example, in the case of inter-encoding, the prediction image selector 627 selects the inter-prediction unit 626 as the supply source for the prediction image. Then, the prediction image selector 627 supplies the prediction image supplied from the inter-prediction unit 626 to the arithmetic unit 612 and the arithmetic unit 620.

The scalable encoder 623 is a processor having the same function as the scalable encoder 112, to which the present technology is applied. That is, the scalable encoder 623 has the same configuration as the scalable encoder 112 and performs the same processing. That is, the scalable encoder 623 scalably encodes (scalably and simply encodes) decoded image data supplied from the loop filter 622. The scalable encoder 623 supplies the encoded data of the layers to the frame memory 624 for storing it.

The frame memory 624 is the same storage as the storage 114. That is, the frame memory 624 stores the encoded data of layers that is supplied from the scalable encoder 623. The frame memory 624 supplies the stored encoded image data to the scalable decoder 625 as the reference image at a predetermined timing.

The scalable decoder 625 is a processor having the same function as the scalable decoder 115, to which the present technology is applied. That is, the scalable decoder 625 has the same configuration as the scalable decoder 115 and performs the same processing. That is, the scalable decoder 625 reads desired layers of the encoded data from the frame memory 624 as a reference image. The scalable decoder 625 scalably decodes (scalably and simply decodes) the desired layers and combines the obtained decoded image data of the layers. The scalable decoder 625 supplies the obtained image data to the inter-prediction unit 626 as reference image data.

At this time, the scalable decoder 625 may read the layers according to a purpose of use of the image data, for example. For example, the scalable decoder 625 may read the layers according to the picture type of a current picture that is an encoding processing target.

For example, if the current picture is an I-picture, the scalable decoder 625 may perform the following operations. Specifically, the scalable decoder 625 may read the encoded data of the base layer and the enhancement layer from the frame memory 624. The scalable decoder 625 may decode the layers to generate decoded image data in which the base layer and the enhancement layer are combined. The scalable decoder 625 may supply the decoded image data to the inter-prediction unit 626 as the reference image.

For example, if the current picture is a P-picture or a B-picture, the scalable decoder 625 may perform the following operations. Specifically, the scalable decoder 625 may read the encoded data of the base layer from the frame memory 624 and decode the encoded data. The scalable decoder 625 may supply the obtained
decoded image data of the base layer to the inter-prediction unit 626 as the reference image.

Alternatively, if the current picture is the I-picture or the P-picture, the scalable decoder 625 may supply the decoded image data in which the base layer and the enhancement layer are combined to the inter-prediction unit 626 as the reference image. Otherwise, if the current picture is the B-picture, the scalable decoder 625 may supply the decoded image data of the base layer to the inter-prediction unit 626 as the reference image.

With the above-mentioned configuration, if the current picture is a picture used as the reference image, the amount of information of the reference image data can be increased. Otherwise, if the current picture is a picture not used as the reference image, the amount of information of the reference image data can be reduced. With the above-mentioned configuration, the image encoding apparatus 600 can suppress the increase of the memory access band and memory capacity while preventing the image quality from being unnecessarily lowered.

That is, the image encoding apparatus 600 can prevent the quality of the reference image from being unnecessarily lowered due to encoding/decoding the reference image. Thus, the image encoding apparatus 600 can prevent the quality of images to be obtained based on the reference image from being also lowered due to the lower quality of the reference image. Thus, the image encoding apparatus 600 can prevent the encoding efficiency and the quality of the decoded image from being lowered due to the lowered quality of the reference image.

(Flow of Encoding Processing)

Figure 16:
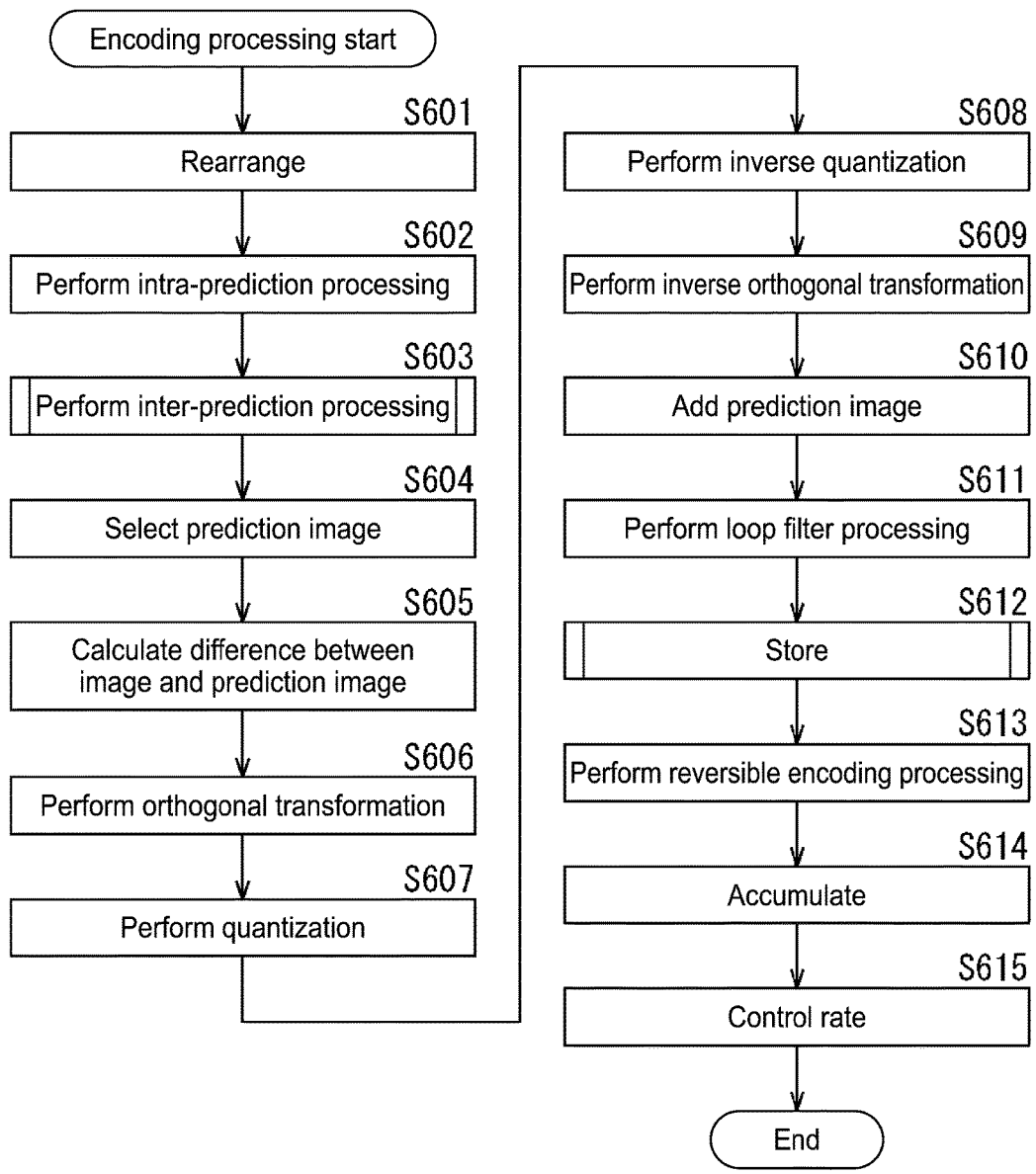
FIG. 16 is a flowchart explaining an example of a flow of encoding processing.

Next, an example of a flow of each type of processing performed by the image encoding apparatus 600 will be described. First of all, an example of a flow of the encoding processing will be described with reference to a flowchart of FIG. 16.

The encoding processing is started. Then, in Step 601, the screen arrangement buffer 611 stores images of frames (pictures) of an input moving image in a display order and rearranges the pictures stored in the display order, in an encoding order.

In Step 602, the intra-prediction unit 621 performs intra-prediction processing on the intra-prediction mode.

In Step 603, the inter-prediction unit 626 performs inter-prediction processing including motion prediction, motion compensation, and the like on the inter-prediction mode.

In Step 604, based on the cost function value or the like, the prediction image selector 627 selects either one of the prediction image generated by the intra-prediction of Step 602 and the prediction image generated by the inter-prediction of Step 603.

In Step 605, the arithmetic unit 612 compensates for a difference between the input image whose order of frames is rearranged by the processing of Step 601 and the prediction image selected by the processing of Step 604. That is, the arithmetic unit 612 generates residual data of the input image and the prediction image. The thus determined residual data has a lower data amount in comparison with the original image data. Therefore, it is possible to reduce the data amount in comparison with the case of encoding an image without any processing.

In Step 606, the orthogonal transformation unit 613 orthogonally transforms the residual data generated in Step 605.

In Step 607, the quantization unit 614 quantizes an orthogonal transformation coefficient obtained by the processing of Step 606, using the quantization parameter calculated by the rate controller 617.

In Step 608, the inverse quantization unit 618 inversely quantizes the quantized coefficient generated by the processing of Step 607, using characteristics corresponding to the characteristics of the quantization.

In Step 609, the inverse orthogonal transformation unit 619 inversely orthogonally transforms the orthogonal transformation coefficient obtained by the processing of Step 608.

In Step 610, the arithmetic unit 620 adds the prediction image selected by the processing of Step 605 to the residual data restored by the processing of Step 609, to thereby generate image data of the reconstruction image.

In Step 611, the loop filter 622 performs the loop filter processing on the image data of the reconstruction image that is generated by the processing of Step 610. With this, the block distortion or the like of the reconstruction image is removed.

In Step 612, by performing the storage processing described with reference to the flowchart of FIG. 9, the scalable encoder 623 scalably encodes (scalably and simply encodes) the locally decoded image, which is obtained by the processing of Step 611, and causes the frame memory 624 to store the encoded image.

In Step 613, the reversible encoder 615 encodes the quantized coefficient obtained by the processing of Step 607. That is, reversible encoding such as the variable-length encoding and the arithmetic encoding is performed on the data corresponding to the residual data.

At this time, the reversible encoder 615 encodes information on the prediction mode of the prediction image that is selected by the processing of Step 604 and adds it to the encoded data obtained by encoding the differential data. Specifically, the reversible encoder 615 encodes optimal intra-prediction mode information supplied from the intra-prediction unit 621, information corresponding to an optimal inter-prediction mode supplied from the inter-prediction unit 626, or the like and adds it to the encoded data.

In Step 614, the accumulation buffer 616 accumulates the encoded data and the like obtained by the processing of Step 613. The encoded data and the like accumulated in the accumulation buffer 616 are appropriately read as the bit stream and transmitted to a decoder section via a transmission channel and a recording medium.

In Step 615, the rate controller 617 controls, based on a code amount (generated code amount) of the encoded data and the like accumulated in the accumulation buffer 616 by the processing of Step 614, the rate of the quantization processing of Step 607 such that no overflow or underflow occurs. The processing of Step 615 ends. Then, the encoding processing ends.

(Flow of Inter-Prediction Processing)

Figure 17:
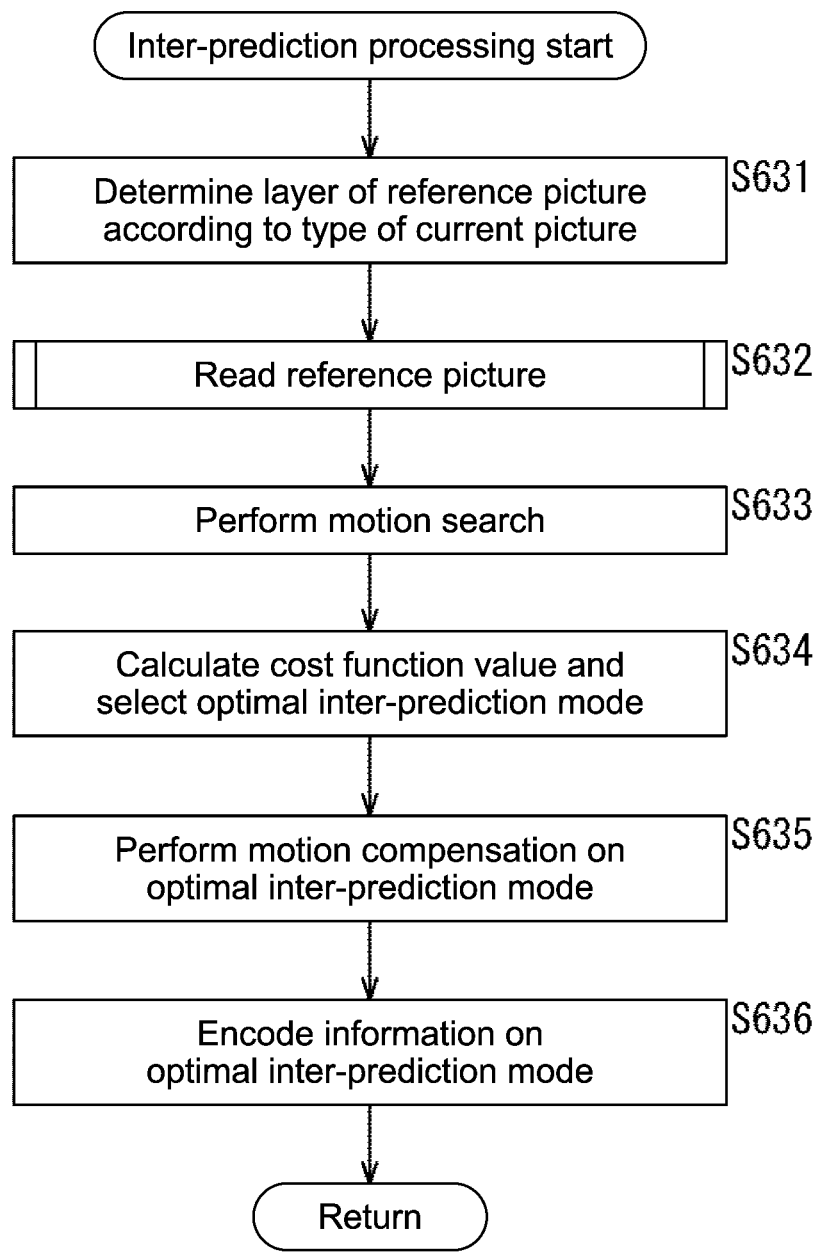
FIG. 17 is a flowchart explaining an example of a flow of inter-prediction processing.

Next, with reference to a flowchart of FIG. 17, an example of a flow of the inter-prediction processing will be described.

The inter-prediction processing is started. Then, in Step 631, the inter-prediction unit 626 determines a layer of a reference picture according to a type of a current picture (picture type).

In Step 632, the scalable decoder 625 performs the read processing described with reference to the flowchart of FIG. 10, to thereby read the layer of the reference picture, which is determined by Step 631, from the frame memory 624.

In Step 633, the inter-prediction unit 626 performs motion search using the read reference picture and the like.

In Step 634, the inter-prediction unit 626 calculates a cost function value for each mode and selects an optimal inter-prediction mode based on the calculated values.

In Step 635, the inter-prediction unit 626 performs motion compensation on the optimal inter-prediction mode selected in Step 634 to generate a prediction image, and supplies the prediction image to the prediction image selector 627.

In Step 636, the inter-prediction unit 626 supplies information on the optimal inter-prediction mode to the reversible encoder 615 and encodes this information.

The processing of Step 636 ends. Then, the inter-prediction processing ends. The processing returns to FIG. 16.

By performing the various types of processing as described above, the image encoding apparatus 600 can suppress the increase of the memory access band and memory capacity while preventing the image quality from being unnecessarily lowered.

7. Seventh Embodiment (Image Decoding Apparatus)

Figure 18:
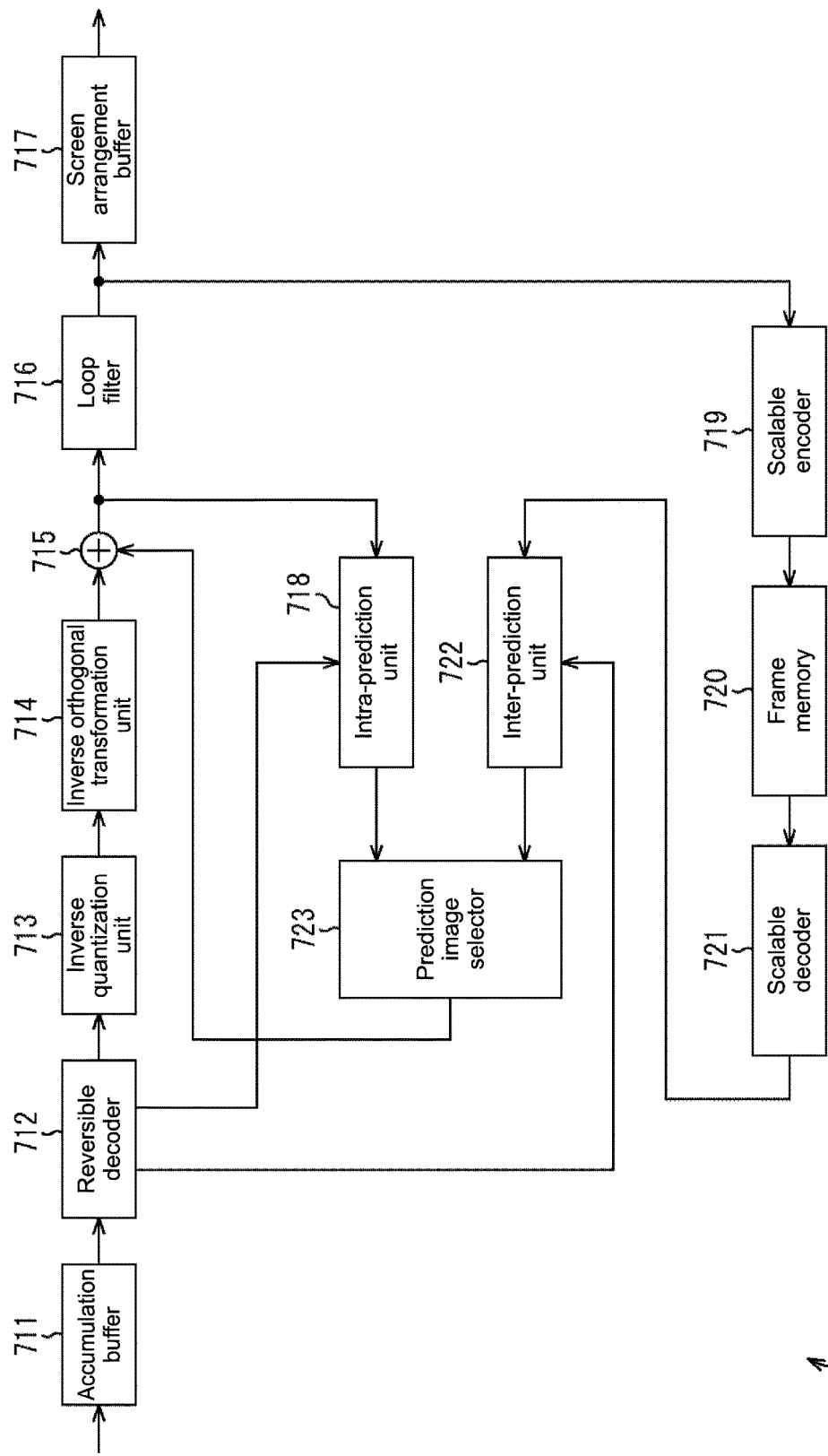
FIG. 18 is a block diagram showing a main configuration example of an image decoding apparatus.

The present technology is also applicable to image decoding in which decoding is performed using the reference image, for example, as in the MPEG, AVC, or HEVC. FIG. 18 is a block diagram showing a configuration of an image decoding apparatus as an embodiment of the image processing apparatus to which the present technology is applied. An image decoding apparatus 700 shown in FIG. 18 is an image decoding apparatus corresponding to the image encoding apparatus 600 of FIG. 15 and decodes data encoded by the image encoding apparatus 600. At this time, the image decoding apparatus 700 causes the frame memory to temporarily store image data used for decoding as a reference image.

As shown in FIG. 18, the image decoding apparatus 700 includes an accumulation buffer 711, a reversible decoder 712, an inverse quantization unit 713, an inverse orthogonal transformation unit 714, an arithmetic unit 715, a loop filter 716, and a screen arrangement buffer 717. The image decoding apparatus 700 further includes an intra-prediction unit 718, a scalable encoder 719, a frame memory 720, a scalable decoder 721, an inter-prediction unit 722, and a prediction image selector 723.

The accumulation buffer 711 also serves a receiver that receives the encoded data transmitted from an encoder section (e.g., image encoding apparatus 600). The accumulation buffer 711 receives and accumulates the transmitted encoded data and supplies the encoded data to the reversible decoder 712 at a predetermined timing. To the encoded data, added is information necessary for decoding, for example, prediction mode information. The reversible decoder 712 decodes the information encoded by the reversible encoder 615, which is supplied from the accumulation buffer 711, by a decoding method corresponding to the encoding method. The reversible decoder 712 supplies the quantized coefficient data, which is obtained by the decoding, to the inverse quantization unit 713.

The reversible decoder 712 judges which of the intra-prediction mode and the inter-prediction mode has been selected as an optimal prediction mode. The reversible decoder 712 supplies information on the optimal prediction mode to either one of the intra-prediction unit 718 and the inter-prediction unit 722, which is associated with the mode judged to be selected. Specifically, for example, if the intra-prediction mode is selected as the optimal prediction mode in the image encoding apparatus 600, the information on the optimal prediction mode is supplied to the intra-prediction unit 718. For example, if the inter-prediction mode is selected as the optimal prediction mode in the image encoding apparatus 600, the information on the optimal prediction mode is supplied to the inter-prediction unit 722.

In addition, the reversible decoder 712 supplies information necessary for inverse quantization, for example, information on a quantization matrix and a quantization parameter to the inverse quantization unit 713.

The inverse quantization unit 713 inversely quantizes the quantized coefficient data obtained by the decoding of the reversible decoder 712 by a method corresponding to a quantization method of the quantization unit 614. Note that the inverse quantization unit 713 is the same processor as the inverse quantization unit 618. That is, the description of the inverse quantization unit 713 is also applicable to the inverse quantization unit 618. It should be noted that a data input/output destination and the like need to be changed in accordance with the apparatus in the description.

The inverse quantization unit 713 supplies the obtained coefficient data to the inverse orthogonal transformation unit 714.

The inverse orthogonal transformation unit 714 inversely orthogonally transforms the orthogonal transformation coefficient supplied from the inverse quantization unit 713 by a method corresponding to an orthogonal transformation method of the orthogonal transformation unit 613 if necessary. Note that the inverse orthogonal transformation unit 714 is the same processor as the inverse orthogonal transformation unit 619. That is, the description of the inverse orthogonal transformation unit 714 is also applicable to the inverse orthogonal transformation unit 619. It should be noted that a data input/output destination and the like need to be changed in accordance with the apparatus in the description.

By the inverse orthogonal transformation processing, the inverse orthogonal transformation unit 714 obtains residual data corresponding to the state before the orthogonal transformation in the image encoding apparatus 600. The residual data obtained by the inverse orthogonal transformation is supplied to the arithmetic unit 715.

The arithmetic unit 715 obtains the residual data supplied from the inverse orthogonal transformation unit 714. Further, the arithmetic unit 715 obtains the prediction image from the intra-prediction unit 718 or the inter-prediction unit 722 through the prediction image selector 723. The arithmetic unit 715 adds the differential data and the prediction image to obtain a reconstruction image corresponding to the image before the prediction image is subtracted by the arithmetic unit 612. The arithmetic unit 715 supplies the reconstruction image to the loop filter 716 and the intra-prediction unit 718.

The loop filter 716 appropriately subjects the supplied reconstruction image to the loop filter processing including deblocking filtering processing, adaptive loop filter processing, and the like to generate a decoded image. For example, the loop filter 716 performs the deblocking filtering processing on the reconstruction image, to thereby remove block distortion. Further, for example, the loop filter 716 performs the loop filter processing on the deblocking filtering processing result (reconstruction image from which block distortion has been removed) with a Wiener filter, to thereby improve the image quality.

Note that any type of the filtering processing can be performed by the loop filter 716 and filtering processing other than that described above may be performed. Alternatively, the loop filter 716 may perform filtering processing using a filter coefficient supplied from the image encoding apparatus 600.

The loop filter 716 supplies the decoded image that is the filtering processing result to the screen arrangement buffer 717 and the scalable encoder 719.

The screen arrangement buffer 717 performs image rearrangement. That is, the order of frames rearranged in the order for encoding by the screen arrangement buffer 611 is rearranged in the original display order. The screen arrangement buffer 717 outputs the decoded image data whose order of frames has been rearranged to an outside of the image decoding apparatus 700.

The intra-prediction unit 718 is appropriately supplied with information or the like indicating the intra-prediction mode obtained by decoding the header information from the reversible decoder 712. The intra-prediction unit 718 performs the intra-prediction using the reference image obtained from the arithmetic unit 715 on the intra-prediction mode used in the intra-prediction unit 621 to generate a prediction image. The intra-prediction unit 718 supplies the generated prediction image to the prediction image selector 723.

The inter-prediction unit 722 obtains information obtained by decoding the header information (optimal prediction mode information, reference image information, and the like) from the reversible decoder 712.

The inter-prediction unit 722 performs the inter-prediction using the reference image obtained from the scalable decoder 721 on the inter-prediction mode indicated by the optimal prediction mode information obtained from the reversible decoder 712 to generate a prediction image.

The prediction image selector 723 supplies the prediction image from the intra-prediction unit 718 or the prediction image from the inter-prediction unit 722 to the arithmetic unit 715. Then, in the arithmetic unit 715, the prediction image generated by using a motion vector and the residual data (differential image information) are added and the original image is decoded.

The scalable encoder 719 is a processor having the same function as the scalable encoder 112, to which the present technology is applied. That is, the scalable encoder 719 has the same configuration as the scalable encoder 112 and performs the same processing. That is, the scalable encoder 719 scalably encodes (scalably and simply encodes) the decoded image data supplied from the loop filter 716 and supplies the encoded data of the layers to the frame memory 720 for storing it.

The frame memory 720 is the same storage as the storage 114. That is, the frame memory 720 stores the encoded data of the layers supplied from the scalable encoder 719. Further, the frame memory 720 supplies the stored decoded image to the scalable decoder 721 as the reference image at a predetermined timing.

The scalable decoder 721 is a processor having the same function as the scalable decoder 115, to which the present technology is applied. That is, the scalable decoder 721 has the same configuration as the scalable decoder 115 and performs the same processing. That is, the scalable decoder 721 reads desired layers of the encoded data from the frame memory 720 as the reference image. The scalable decoder 721 scalably decodes (scalably and simply decodes) the desired layers of the encoded data and combines the obtained decoded image data of the layers. The scalable decoder 721 supplies the obtained image data to the inter-prediction unit 722 as the reference image data.

At this time, the scalable decoder 721 may read the layers according to the purpose of use of the image data, for example. For example, the scalable decoder 721 may read the layers according to the picture type of the current picture that is an encoding processing target.

For example, the scalable decoder 721 may perform the following operations if the current picture is the I-picture. Specifically, the scalable decoder 721 may read the encoded data of the base layer and the enhancement layer from the frame memory 720. The scalable decoder 721 may decode each layer and generate decoded image data in which the base layer and the enhancement layer are combined. The scalable decoder 721 may supply it to the inter-prediction unit 722 as the reference image.

Alternatively, for example, the scalable decoder 721 may perform the following operations if the current picture is the P-picture or the B-picture. Specifically, the scalable decoder 721 may read the encoded data of the base layer from the frame memory 720 and decode it. The scalable decoder 721 may supply the obtained decoded image data of the base layer to the inter-prediction unit 722 as the reference image.

Alternatively, the scalable decoder 721 may supply, if the current picture is the I-picture or the P-picture, the decoded image data in which the base layer and the enhancement layer are combined to the inter-prediction unit 722 as the reference image. If the current picture is the B-picture, the decoded image data of the base layer may be supplied to the inter-prediction unit 722 as the reference image.

With the above-mentioned configuration, if the current picture is a picture used as the reference image, the amount of information of the reference image data can be increased. If the current picture is a picture not used as the reference image, the amount of information of the reference image data can be reduced. With the above-mentioned configuration, the image decoding apparatus 700 can suppress the increase of the memory access band and memory capacity while preventing the image quality from being unnecessarily lowered.

That is, the image decoding apparatus 700 can prevent the quality of the reference image from being unnecessarily lowered due to encoding/decoding the reference image. Thus, the image decoding apparatus 700 can prevent the quality of images to be obtained based on the reference image from being also lowered due to the lower quality of the reference image. Thus, the image decoding apparatus 700 can prevent the quality of the decoded image from being lowered due to the lowered quality of the reference image.

(Flow of Decoding Processing)

Figure 19:
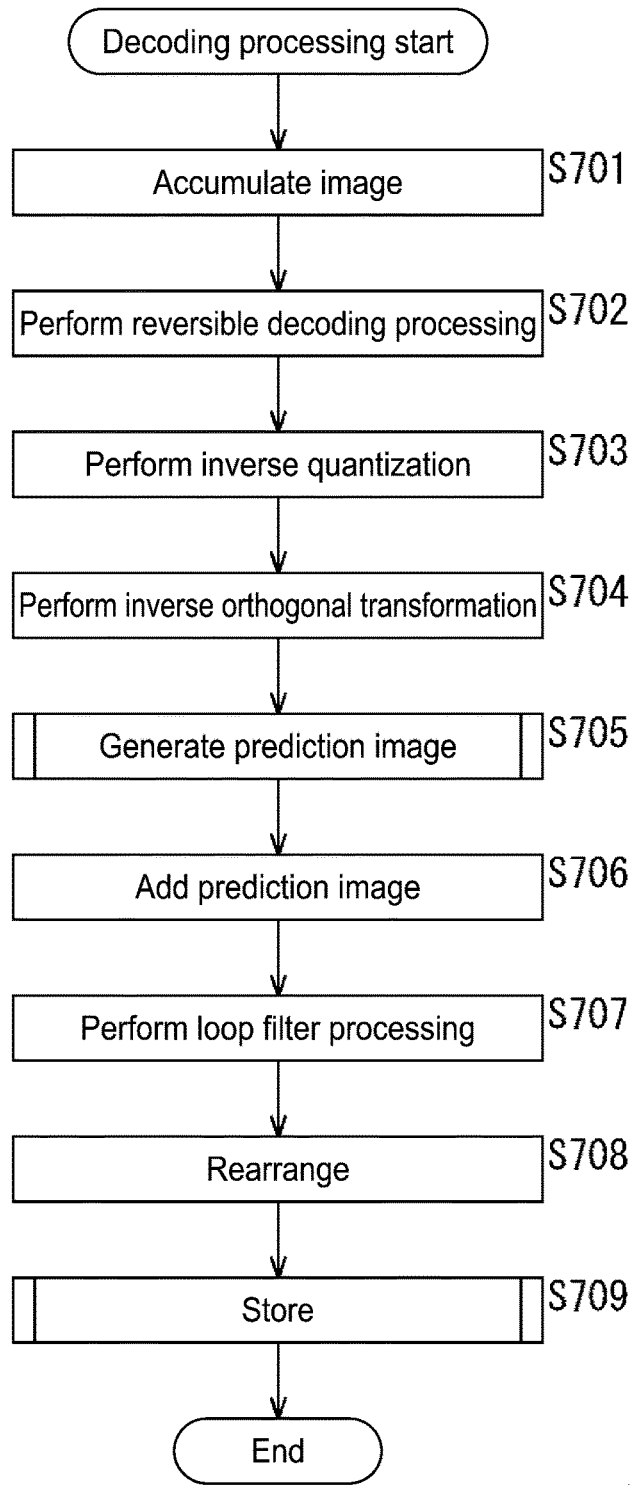
FIG. 19 is a flowchart explaining an example of a flow of decoding processing.

Next, an example of a flow of each type of processing performed by the image decoding apparatus 700 will be described. First of all, an example of a flow of decoding processing will be described with reference to a flowchart of FIG. 19.

The decoding processing is started. Then, in Step 701, the accumulation buffer 711 accumulates a transmitted bit stream. In Step 702, the reversible decoder 712 decodes the bit stream supplied from the accumulation buffer 711. That is, the I-picture, P-picture, and B-picture encoded by the reversible encoder 615 are decoded.

In Step 703, the inverse quantization unit 713 inversely quantizes a quantized coefficient obtained by the processing of Step 702.

In Step 704, the inverse orthogonal transformation unit 714 inversely orthogonally transforms the orthogonal transformation coefficient obtained by the processing of Step 703. By this processing, the residual data is restored.

In Step 705, the intra-prediction unit 718 or the inter-prediction unit 722 performs prediction processing to generate a prediction image. That is, the prediction processing is performed on a prediction mode applied during encoding, which is judged by the reversible decoder 712. More specifically, for example, if the intra-prediction has been applied during encoding, the intra-prediction unit 718 generates the prediction image on the intra-prediction mode judged to be optimal during encoding. For example, if the inter-prediction has been applied during encoding, the inter-prediction unit 722 generates the prediction image on the inter-prediction mode judged to be optimal during encoding.

In Step 706, the arithmetic unit 715 adds the prediction image generated in Step 705 to the residual data restored by the processing of Step 704. With this, the reconstruction image can be obtained.

In Step 707, the loop filter 716 appropriately subjects the reconstruction image obtained by the processing of Step 706 to the loop filter processing including deblocking filtering processing, adaptive loop filter processing, and the like.

In Step 708, the screen arrangement buffer 717 rearranges frames of the decoded image obtained by the processing of Step 707. That is, the order of frames rearranged during encoding is rearranged in the original display order. The decoded image whose frames have been rearranged is output to the outside of the image decoding apparatus 700.

In Step 709, by performing the storage processing described above with reference to the flowchart of FIG. 9, the scalable encoder 719 scalably encodes (scalably and simply encodes) the locally decoded image, which is obtained by the processing of Step 707, and causes the frame memory 720 to store it. The processing of Step 709 ends. Then, the decoding processing ends.

(Flow of Prediction Image Generation Processing)

Figure 20:
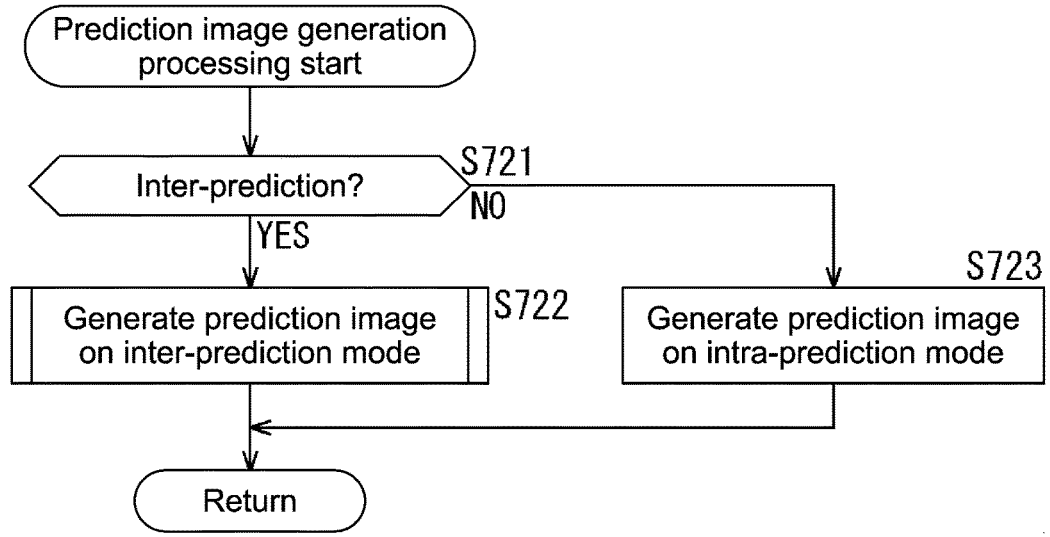
FIG. 20 is a flowchart explaining an example of a flow of prediction image generation processing.

Next, an example of a flow of the prediction image generation processing performed in Step 705 of such decoding processing will be described with reference to a flowchart of FIG. 20.

The prediction image generation processing is started. Then, in Step 721, the reversible decoder 712 judges whether or not the inter-prediction is performed. If it is judged that the inter-prediction is performed, the processing proceeds to Step 722.

In Step 722, the inter-prediction unit 722 generates a prediction image on the inter-prediction mode. The processing of Step 722 ends. Then, the processing returns to FIG. 19.

Otherwise, it is judged in Step 721 that the inter-prediction is not performed, the processing proceeds to Step 723. In Step 723, the intra-prediction unit 718 generates a prediction image on the intra-prediction mode. The processing of Step 723 ends. Then, the processing returns to FIG. 19.

(Flow of Inter-Prediction-Mode Prediction Image Generation Processing)

Figure 21:
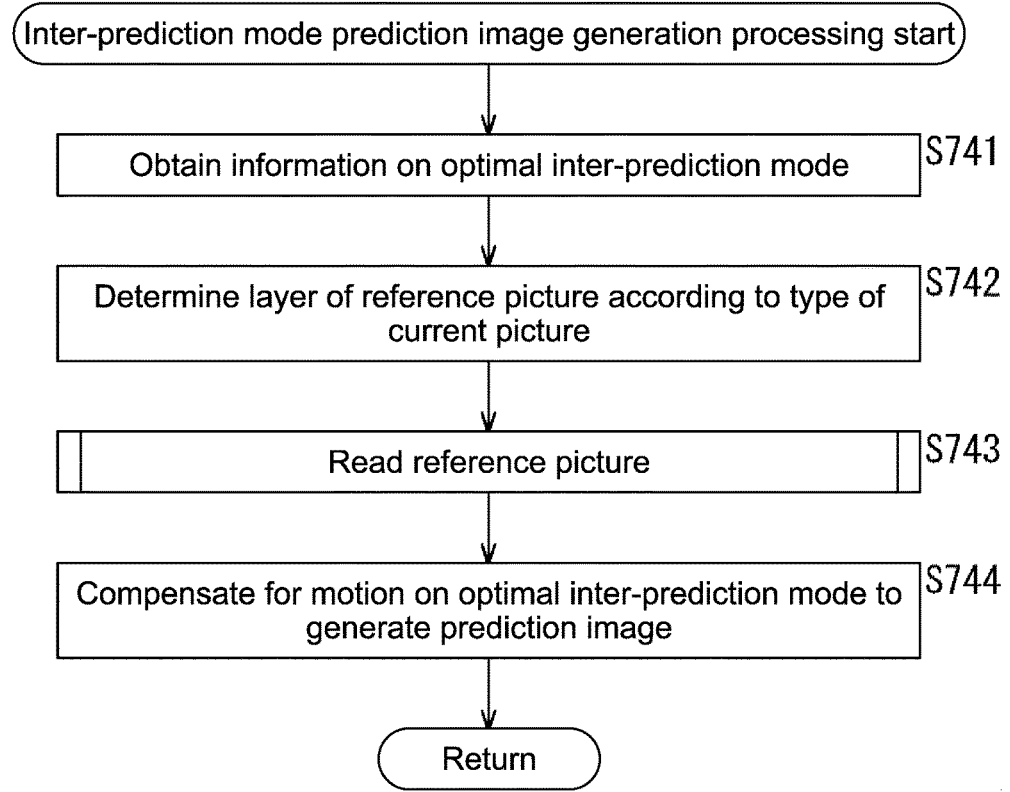
FIG. 21 is a flowchart explaining an example of a flow of inter-prediction-mode prediction image generation processing.

Next, an example of a flow of the inter-prediction-mode prediction image generation processing performed in Step 722 of such prediction image generation processing will be described with reference to a flowchart of FIG. 21.

The inter-prediction-mode prediction image generation processing is started. Then, in Step 741, the inter-prediction unit 722 obtains information on the optimal inter-prediction mode.

In Step 742, the inter-prediction unit 722 determines a layer of the reference picture according to a type of a current picture.

In Step 743, the scalable decoder 721 performs the read processing described above with reference to the flowchart of FIG. 10 to read the layer of the reference picture, which is determined in Step 742, from the frame memory 720.

In Step 744, the inter-prediction unit 722 performs a motion compensation on the optimal inter-prediction mode to generate a prediction image.

The processing of Step 744 ends. Then, the inter-prediction-mode prediction image generation processing ends. The processing returns to FIG. 20.

By performing the respective processes as described above, the image decoding apparatus 700 can suppress the increase of the memory access band and memory capacity while preventing the image quality from being unnecessarily lowered.

8. Eighth Embodiment (Computer)

The above-mentioned series of processing may be executed by hardware or may be executed by software. If the series of processing is executed by software, programs configuring the software are installed into the computer. Here, the computer includes a computer incorporated in dedicated hardware and a general-purpose personal computer that installs various programs to be able to execute various functions, for example.

Figure 22:
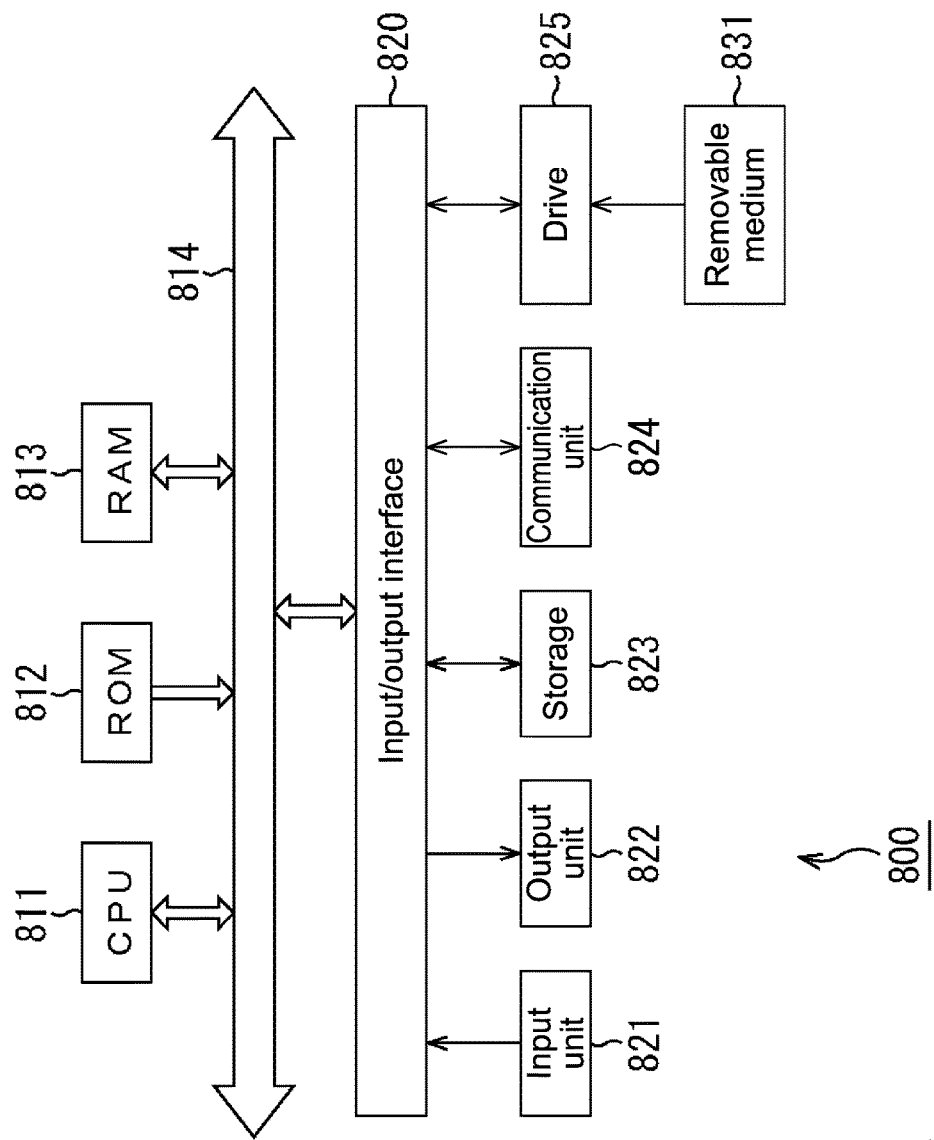
FIG. 22 is a block diagram showing a main configuration example of a computer.

FIG. 22 is a block diagram showing a configuration example of hardware of a computer that executes the above-mentioned series of processing according to programs.

In a computer 800 shown in FIG. 22, a central processing unit (CPU) 811, a read only memory (ROM) 812, and a random access memory (RAM) 813 are connected to one another via a bus 814.

To the bus 814, also connected is an input/output interface 820. To the input/output interface 820, connected are an input unit 821, an output unit 822, storage 823, a communication unit 824, and a drive 825.

The input unit 821 includes, for example, a keyboard, a mouse, a microphone, a touch panel, and an input terminal. The output unit 822 includes, for example, a display, a speaker, an output terminal. The storage 823 includes, for example, a hard disc, a RAM disc, a non-volatile memory. The communication unit 824 includes, for example, a network interface. The drive 825 drives a removable medium 831 such as a magnetic disc, an optical disc, a magneto-optical disc, and a semiconductor memory.

In the thus configured computer, the above-mentioned series of processing is performed by the CPU 811 loading programs stored in the storage 823, for example, into the RAM 813 via the input/output interface 820 and the bus 814 and executing the programs. Necessary data and the like for the CPU 811 to execute various types of processing are also appropriately stored in the RAM 813.

The programs executed by the computer (CPU 811) can be recoded on the removable medium 831 as, for example, a package medium and applied. In this case, the programs can be installed into the storage 823 via the input/output interface 820 by mounting the removable medium 831 on the drive 825.

Alternatively, the programs may be provided via a wired or wireless transmission medium, for example, a local area network, the Internet, or digital satellite broadcasting. In this case, the programs can be received by the communication unit 824 and installed into the storage 823.

Otherwise, the programs may be installed in the ROM 812 or the storage 823 in advance.

Note that if the present technology is applied to the television apparatus 200 (FIG. 11) and the series of processing is executed by software, programs to be executed by the controller 231 can be installed into the controller 231 via the bus 230, by the removable medium 236 storing the programs being mounted on the drive 235, for example. Alternatively, the programs may be received from the outside via the external interface unit 234 and installed into the controller 231. Still alternatively, the programs may also be installed into the controller 231 in advance.

Similarly, if the present technology is applied to the cellular phone 300 (FIG. 12) and the series of processing is executed by software, programs to be executed by the controller 331 can be installed into the controller 331 via the bus 310, by the removable medium 334 storing the programs being mounted on the drive 333, for example. Alternatively, the programs may be received from the outside via the communication unit 312 and installed into the controller 331. Still alternatively, the programs may also be installed into the controller 331 in advance.

Similarly, if the present technology is applied to the image capturing apparatus 400 (FIG. 13) and the series of processing is executed by software, programs to be executed by the controller 431 can be installed into the controller 431, by the removable medium 434 storing the programs being mounted on the drive 433, for example. Alternatively, the programs may be received from the outside via the communication unit 419 and installed into the controller 431. Still alternatively, the programs may also be installed into the controller 431 in advance.

Note that the programs executed by the computer may be programs for performing processing in a time series in the order described herein or may be programs for performing processing in parallel or at a necessary timing, for example, when called.

A step of describing the programs stored in the recording medium includes processes performed in a time series in the order described herein, of course. However, the processes do not necessarily need to be processed in a time series and may be performed in parallel or individually.

Further, in the specification, the system means a collection of a plurality of components (apparatuses, modules (parts), etc.) and all the components do not necessarily need to be in the same casing. Thus, a plurality of apparatuses housed in individual casings and connected via a network and a single apparatus including a plurality of modules housed in a single casing are both the system.

Alternatively, the component described above as a single apparatus (or processor) may be divided and configured as a plurality of apparatuses (or processors). In contrast, the components described above as a plurality of apparatuses (or processors) may be collected and configured as a single apparatus (or processor). Further, a component other than those described above may be added to the components of each apparatus (or each processor). In addition, as long as substantially the same components and operations are provided in the entire system, some of the components of a certain apparatus (or processor) may be included in other apparatuses (or other processors).

Although favorable embodiments of the present disclosure have been described above in details with reference to the accompanied drawings, the technical range of the present disclosure is not limited to the above-mentioned examples. It is clear that those skilled in the art can achieve various changed or modified examples without departing from the technical concept defined by the scope of claims. Of course, it should be understood that the changed or modified examples fall in the technical range of the present disclosure.

For example, the present technology can take a cloud computing configuration in which a single function is shared with and processed by a plurality of apparatuses via a network.

Further, the steps described above referring to the flowcharts can be performed by a single apparatus or shared with and performed by a plurality of apparatuses.

In addition, if a single step includes a plurality of processes, the plurality of processes of the single step can be performed by a single apparatus or shared with and performed by a plurality of apparatuses.

The image encoding apparatus and image decoding apparatus according to the above-mentioned embodiments can be applied to various electronic apparatuses. For example, the image encoding apparatus and image decoding apparatus can be applied to a transmitter or receiver in delivery in satellite broadcasting, cable broadcasting of a cable TV or the like, and the Internet, delivery to a terminal in cellular communication, or the like, to a recording apparatus that records images on a medium such as an optical disc, a magnetic disc, and a flash memory, or to a reproduction apparatus that reproduces images from such a storage medium.

For example, the image encoding apparatus 600 is applicable to an encoder (not shown) in the recording/reproducing unit 320 of the cellular phone 300 (FIG. 12), the codec processor 417 of the image capturing apparatus 400 (FIG. 13), or the video encoder 521 of the video unit (FIG. 14). For example, the image decoding apparatus 700 is applicable to the decoder 214 of the television apparatus 200 (FIG. 11), a decoder (not shown) in the recording/reproducing unit 320 of the cellular phone 300 (FIG. 12), the codec processor 417 of the image capturing apparatus 400 (FIG. 13), or the video decoder 522 of the video unit (FIG. 14). Of course, applicable apparatuses are not limited to these examples.

The example in which the various types of information are multiplexed on the encoded stream and transmitted from the encoder section to the decoder section has been described herein. However, the method of transmitting these information pieces is not limited to the example above. For example, these information pieces may be transmitted or recorded as individual data items associated with the encoded bit stream without being multiplexed on the encoded bit stream. Here, the term "associating" means causing an image included in a bit stream (that may be a part of the image, for example, a slice or a block) and information corresponding to this image to be able to be linked with each other during decoding. That is, the information pieces may be transmitted through a transmission channel other than that for the image (or bit stream). Alternatively, the information pieces may be recorded on a recording medium other than that for the image (or bit stream) (or in another recording area of the same recording medium). Still alternatively, the information and the image (or bit stream) may be associated with each other in any units, for example, in units of a plurality of frames, one frame, or a part of a frame.

Note that the present technology may also take the following configurations.

(1) An image processing apparatus, including:
an encoder configured to scalably encode image data;
a write unit configured to cause storage via a predetermined bus to store encoded data that is the image data scalably encoded by the encoder;
a read unit configured to read a desired layer of the encoded data from the storage via the bus; and
a decoder configured to scalably decode the encoded data read from the storage by the read unit.

(2) The image processing apparatus according to any one of (1) and (3) to (9), in which
the read unit is configured to read a layer of the encoded data in accordance with image processing with respect to the image data obtained by the decoder simply decoding the encoded data.

(3) The image processing apparatus according to any one of (1), (2), and (4) to (9), further including:
the bus; and
the storage.

(4) The image processing apparatus according to any one of (1) to (3) and (5) to (9), in which
the encoder is configured to simply encode the image data by a fixed-length method in which a data length is fixed.

(5) The image processing apparatus according to (1) to (4) and (6) to (9), in which
the encoder is configured to make a bit depth of the image data scalable and simply encode the image data.

(6) The image processing apparatus according to any one of (1) to (5) and (7) to (9), in which
the encoder is configured to make a resolution of the image data scalable and simply encode the image data.

(7) The image processing apparatus according to any one of (1) to (6), (8), and (9), in which
the encoder is configured to make a frequency component of the image data scalable and simply encode the image data.

(8) The image processing apparatus according to any one of (1) to (7) and (9) in which
the encoder includes a plurality of single-layer encoders configured to simply encode mutually different layers of the image data and is configured to scalably encode the image data by a multi-stage configuration of the single-layer encoders.

(9) The image processing apparatus according to any one of (1) to (8), in which
the decoder includes a plurality of single-layer decoders configured to simply decode mutually different layers of the encoded data and is configured to scalably decode the encoded data by a multi-stage configuration of the single-layer decoders.

(10) An image processing method, including:
scalably encoding image data;
causing storage to store encoded data that is the scalably encoded image data via a predetermined bus;
reading a desired layer of the encoded data from the storage via the bus; and
scalably decoding the encoded data read from the storage.

(11) An image encoding apparatus, including:
a scalable encoder configured to scalably encode image data referred to when generating a prediction image;
storage configured to store encoded data that is the image data scalably encoded by the scalable encoder;
a read unit configured to read a desired layer of the encoded data from the storage;
a scalable decoder configured to scalably decode the encoded data, which is read from the storage by the read unit, to generate reference image data;
a prediction unit configured to perform prediction using the reference image data, which is obtained by the scalable decoder scalably decoding the encoded data, to generate the prediction image; and
an encoder configured to encode image data using the prediction image generated by the prediction unit.

(12) The image encoding apparatus according to any one of (11) and (13) to (19), in which
the read unit is configured to read a layer according to a picture type of a current picture that is a processing target.

(13) The image encoding apparatus according to any one of (11), (12), and (14) to (19), in which
the read unit is configured to read a layer according to the purpose of use of the image data.

(14) The image encoding apparatus according to any one of (11) to (13) and (15) to (19), in which
the scalable encoder is configured to simply encode the image data by a fixed-length method in which a data length is fixed.

(15) The image processing apparatus according to any one of (11) to (14) and (16) to (19), in which
the scalable encoder is configured to make a bit depth of the image data scalable and simply encode the image data.

(16) The image processing apparatus according to any one of (11) to (15) and (17) to (19), in which
the scalable encoder is configured to make a resolution of the image data scalable and simply encode the image data.

(17) The image processing apparatus according to any one of (11) to (16), (18), and (19), in which
the scalable encoder is configured to make a frequency component of the image data scalable and simply encode the image data.

(18) The image processing apparatus according to any one of (11) to (17) and (19) in which
the scalable encoder includes a plurality of single-layer encoders configured to simply encode mutually different layers of the image data and is configured to scalably encode the image data by a multi-stage configuration of the single-layer encoders.

(19) The image processing apparatus according to any one of (11) to (18) in which the scalable decoder includes a plurality of single-layer decoders configured to simply decode mutually different layers of the encoded data and is configured to scalably decode the encoded data by a multi-stage configuration of the single-layer decoders.

(20) An image encoding method, including:

scalably encoding image data referred to when generating a prediction image;

storing encoded data that is the scalably encoded image data in storage;

reading a desired layer of the encoded data from the storage;

scalably decoding the encoded data read from the storage to generate reference image data;

performing prediction using the reference image data, which is obtained by scalably decoding the encoded data, to generate the prediction image; and encoding image data using the generated prediction image.

(21) An image decoding apparatus, including:

a scalable encoder configured to scalably encode image data referred to when generating a prediction image;

storage configured to store encoded data that is the image data scalably encoded by the scalable encoder;

a read unit configured to read a desired layer of the encoded data from the storage;

a scalable decoder configured to scalably decode the encoded data, which is read from the storage by the read unit, to generate reference image data;

a prediction unit configured to perform prediction using the reference image data, which is obtained by the scalable decoder scalably decoding the encoded data, to generate the prediction image; and a decoder configured to decode encoded data obtained by encoding image data, using the prediction image generated by the prediction unit.

(22) The image decoding apparatus according to any one of (21) and (23) to (29), in which the read unit is configured to read a layer according to a picture type of a current picture that is a processing target.

(23) The image decoding apparatus according to any one of (21), (22), and (24) to (29), in which the read unit is configured to read a layer according to the purpose of use of the image data.

(24) The image decoding apparatus according to any one of (21) to (23) and (25) to (29), in which the scalable encoder is configured to encode the image data by a fixed-length method in which a data length is fixed.

(25) The image processing apparatus according to any one of (21) to (24) and (26) to (29), in which the scalable encoder is configured to make a bit depth of the image data scalable and simply encode the image data.

(26) The image processing apparatus according to any one of (21) to (25) and (27) to (29), in which the scalable encoder is configured to make a resolution of the image data scalable and simply encode the image data.

(27) The image processing apparatus according to any one of (21) to (26), (28), and (29), in which the scalable encoder is configured to make a frequency component of the image data scalable and simply encode the image data.

(28) The image processing apparatus according to any one of (21) to (27) and (29) in which the scalable encoder includes a plurality of single-layer encoders configured to simply encode mutually different layers of the image data and is configured to scalably encode the image data by a multi-stage configuration of the single-layer encoders.

(29) The image processing apparatus according to any one of (21) to (28) in which the scalable decoder includes a plurality of single-layer decoders configured to simply encode mutually different layers of the encoded data and is configured to scalably decode the encoded data by a multi-stage configuration of the single-layer decoders.

(30) An image decoding method, including:

scalably encoding image data referred to when generating a prediction image;

storing encoded data that is the scalably encoded image data in the storage;

reading a desired layer of the encoded data from the storage;

scalably decoding the encoded data, which is read from the storage, to generate reference image data;

performing prediction using the reference image data, which is obtained by scalably decoding the encoded data, to generate the prediction image; and decoding encoded data obtained by encoding image data, using the generated prediction image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
circuitry configured to:
    layer image data;
    scalably encode each layer of the image data;
    cause storage via a determined bus to store encoded data that is the image data of the each layer scalably encoded;
    read a desired layer of the encoded data from the storage via the determined bus according to a picture type of a current picture that is a target to be processed, wherein the picture type of the current picture is one of I-picture, P-picture or B-picture; and
    scalably decode the encoded data read from the storage.

2. The image processing device according to claim 1,
wherein the circuitry is further configured to read the desired layer of the encoded data in accordance with image processing with respect to the image data obtained as decoded data.

3. The image processing device according to claim 1, further comprising:
the determined bus; and
the storage.

4. The image processing device according to claim 1,
wherein the circuitry is further configured to encode the each layer of the image data by a fixed-length method in which a data length is fixed.

5. The image processing device according to claim 1,
wherein the circuitry is further configured to make a bit depth of the image data scalable and encode the image data.

6. The image processing apparatus according to claim 1, wherein the circuitry is further configured to make a resolution of the image data scalable and simply encode the image data.

7. The image processing apparatus according to claim 1, wherein the circuitry is further configured to make a frequency component of the image data scalable and simply encode the image data.

8. The image processing device according to claim 1, wherein the circuitry is further configured to scalably encode the image data by a multi-stage configuration of a plurality of single-layer encoders.

9. The image processing device according to claim 1, wherein
the circuitry is further configured to scalably decode the encoded data by a multi-stage configuration of a plurality of single-layer decoders.

10. An image processing method, comprising:
layering image data;
scalably encoding each layer of the image data;
causing storage to store encoded data that is the scalably encoded image data of the each layer via a determined bus;
reading a desired layer of the encoded data from the storage via the determined bus according to a picture type of a current picture that is a processing target, wherein the picture type of the current picture is one of I-picture, P-picture or B-picture; and
scalably decoding the encoded data read from the storage.

11. An image encoding device, comprising:
circuitry configured to:
layer image data;
scalably encode each layer of the image data referred to in an event of generation of a prediction image;
store in storage, encoded data that is the image data scalably encoded;
read a desired layer of the encoded data from the storage according to a picture type of a current picture that is a target to be processed, wherein the picture type of the current picture is one of I-picture, P-picture or B-picture;
scalably decode the encoded data, which is read from the storage, to generate reference image data;
generate the prediction image by prediction based on the reference image data obtained as scalably decoded data; and
encode the image data based on the generated prediction image.

12. The image encoding device according to claim 11, wherein
the circuitry is further configured to read the desired layer according to a purpose of use of the image data.

13. The image encoding device according to claim 11, wherein
the circuitry is further configured to encode the image data of the each layer by a fixed-length method in which a data length is fixed.

14. An image encoding method, comprising:
layering image data;
scalably encoding each layer of the image data referred to in an event of generation of a prediction image;
storing encoded data that is the scalably encoded image data in storage;
reading a desired layer of the encoded data from the storage according to a picture type of a current picture that is a processing target, wherein the picture type of the current picture is one of I-picture, P-picture or B-picture;
scalably decoding the encoded data read from the storage to generate reference image data;
generating the prediction image by prediction based on the reference image data obtained by scalably decoding the encoded data; and
encoding the image data based on the generated prediction image.

15. An image decoding device, comprising:
circuitry configured to:
layer image data;
scalably encode each layer of the image data referred to in an event of generation of a prediction image;
store in storage, encoded data that is the image data of the each layer scalably encoded;
read a desired layer of the encoded data from the storage according to a picture type of a current picture that is a target to be processed, wherein the picture type of the current picture is one of I-picture, P-picture or B-picture;
scalably decode the encoded data, which is read from the storage, to generate reference image data;
generate the prediction image by prediction based on the reference image data obtained as scalably decoded data; and
decode encoded data based on the generated prediction image, wherein the image data is encoded to obtain the encoded data.

16. The image decoding device according to claim 15, wherein
the circuitry is further configured to read the desired layer according to a purpose of use of the image data.

17. The image decoding device according to claim 15, wherein
the circuitry is further configured to encode the image data by a fixed-length method in which a data length is fixed.

18. An image decoding method, comprising:
layering the image data;
scalably encoding each layer of the image data referred to in an event of generation of a prediction image;
storing encoded data that is the scalably encoded image data in storage;
reading a desired layer of the encoded data from the storage according to a picture type of a current picture that is a processing target, wherein the picture type of the current picture is one of I-picture, P-picture or B-picture;
scalably decoding the encoded data, which is read from the storage, to generate reference image data;
generating the prediction image by prediction based on the reference image data obtained by scalably decoding the encoded data; and
decoding encoded data, wherein the encoded data is obtained by encoding the image data, based on the generated prediction image.

* * * * *